United States Patent [19]

Enoki et al.

[11] Patent Number: 5,684,998

[45] Date of Patent: Nov. 4, 1997

[54] APPARATUS AND METHOD FOR SUSPENDING AND RESUMING SOFTWARE APPLICATIONS ON A COMPUTER

[75] Inventors: Nobuyuki Enoki, Kadoma; Masaya Miyazaki, Ikeda; Mitsuaki Morita, Hirakata, all of Japan

[73] Assignee: Matsushita Electric Industrial Co., Ltd., Osaka-fu, Japan

[21] Appl. No.: 489,214

[22] Filed: Jun. 12, 1995

Related U.S. Application Data

[63] Continuation of Ser. No. 895,131, Jun. 8, 1992, Pat. No. 5,471,624.

[30] Foreign Application Priority Data

Jun. 6, 1991 [JP] Japan .................... 3-137485

[51] Int. Cl.$^6$ .................................................. G06F 1/32
[52] U.S. Cl. .................................................. 395/750
[58] Field of Search ............................ 395/750, 113, 395/101

[56] References Cited

U.S. PATENT DOCUMENTS

| | | | |
|---|---|---|---|
| 3,959,778 | 5/1976 | Brette | 395/575 |
| 4,096,560 | 6/1978 | Footh | 395/575 |
| 4,290,116 | 9/1981 | Morse | 395/101 |
| 4,307,455 | 12/1981 | Juhasz et al. | 395/750 |
| 4,327,410 | 4/1982 | Patel et al. | 395/410 |
| 4,458,307 | 7/1984 | McAnlis et al. | 395/575 |
| 4,611,289 | 9/1986 | Coppola | 395/750 |
| 4,651,307 | 3/1987 | Toumayan et al. | 395/575 |
| 4,763,333 | 8/1988 | Byrd | 371/66 |
| 4,907,150 | 3/1990 | Arroyo et al. | 395/750 |
| 4,930,101 | 5/1990 | Wong et al. | 395/106 |
| 4,979,143 | 12/1990 | Takano et al. | 395/575 |
| 4,994,934 | 2/1991 | Bouhenguel | 361/71 |
| 5,073,933 | 12/1991 | Rosenthal | 380/25 |
| 5,109,505 | 4/1992 | Kihara | 395/575 |
| 5,129,091 | 7/1992 | Yorimoto et al. | 395/750 |
| 5,148,546 | 9/1992 | Blodgett | 395/750 |
| 5,167,024 | 11/1992 | Smith et al. | 395/750 |
| 5,218,607 | 6/1993 | Saito et al. | 395/750 |
| 5,235,676 | 8/1993 | Clay et al. | 395/113 |
| 5,276,890 | 1/1994 | Arai | 395/750 |
| 5,317,752 | 5/1994 | Jewett et al. | 395/750 |

FOREIGN PATENT DOCUMENTS

| | | |
|---|---|---|
| 0230351 | 1/1987 | European Pat. Off. . |
| 0365128 | 9/1989 | European Pat. Off. . |
| 60-254316 | 12/1985 | Japan . |

OTHER PUBLICATIONS

IBM Technical Disclosure Bulletin, vol. 33, No. 5, Oct. 1990, New York, USA, pp. 169–171, 'Local Area Network Program Distuibution Facility'.

Elektor Electronics, vol. 9, No. 12, Dec. 1983, Canterbury, Great Britain, pp. 12.58–12.61, 'Novram: data storage without batteries'.

Electronique Industrielle, No. 19, Sep. 1981, Paris, France, p. 43, 'Memoire RAM Sauvegardee'.

IBM Technical Disclosure Bulletin, vol. 28, No. 7, Dec. 1985, New York, USA, pp. 3187–3188, 'Suspending and Resuming the Execution of an Expert System'.

Toshiba Book Computer J–3100ss002 DynaBook/DynaBook Guide (with partial translation).

*Primary Examiner*—Ayaz R. Sheikh
*Attorney, Agent, or Firm*—Price, Gess & Ubell

[57] ABSTRACT

A control unit for a computer system regulates the removal of power from the computer system when a user's power off signal is received in correlation with a process control table monitoring those programs in use in a volatile memory. The volatile memory is supplemented with a temporary storing means for reserving certain types of computer programs when the computer system is turned off. The status of a program is determined upon receiving a power off signal and a decision is made on the storage of the program in a temporary storage memory of limited space.

20 Claims, 27 Drawing Sheets

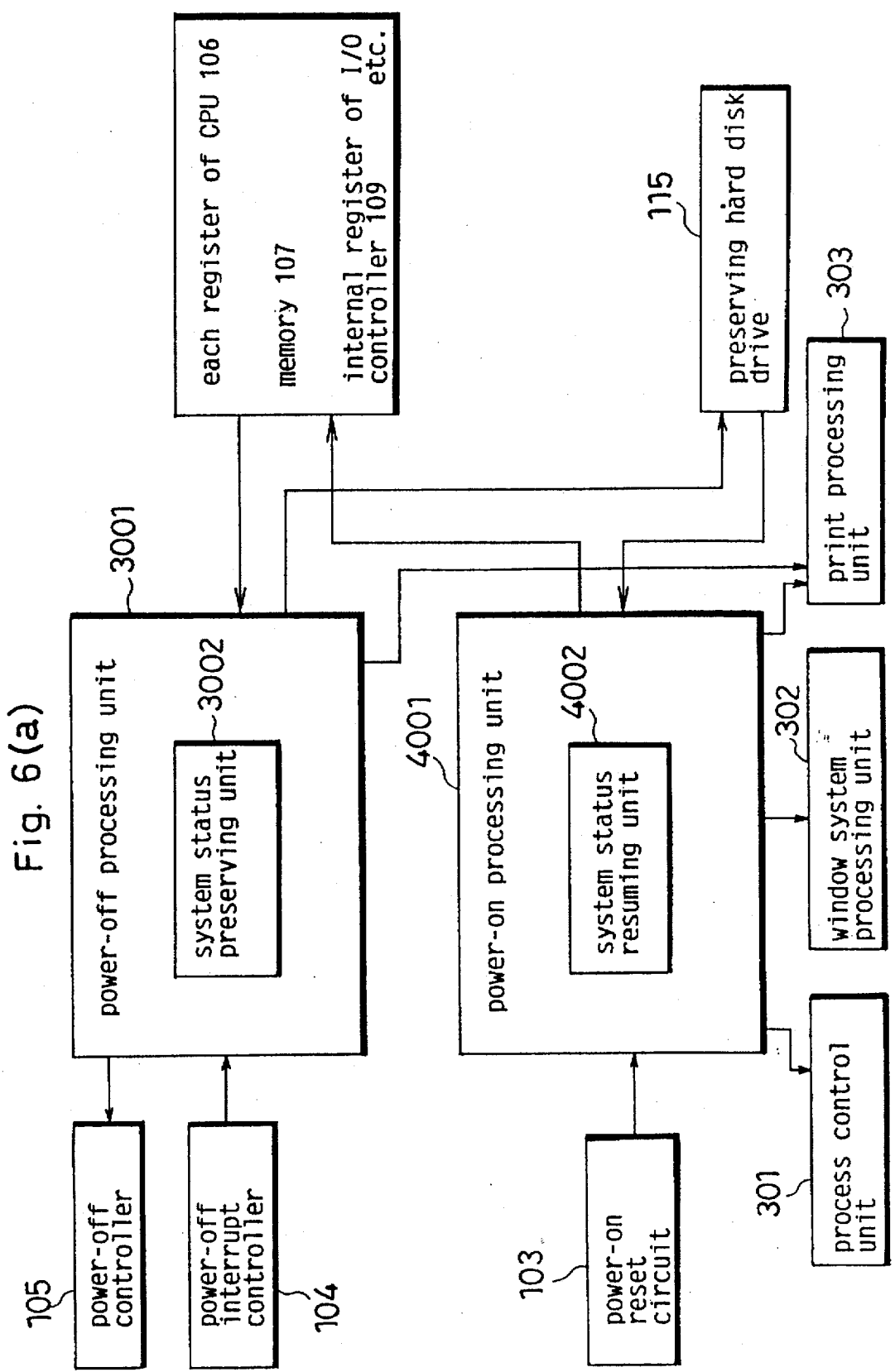

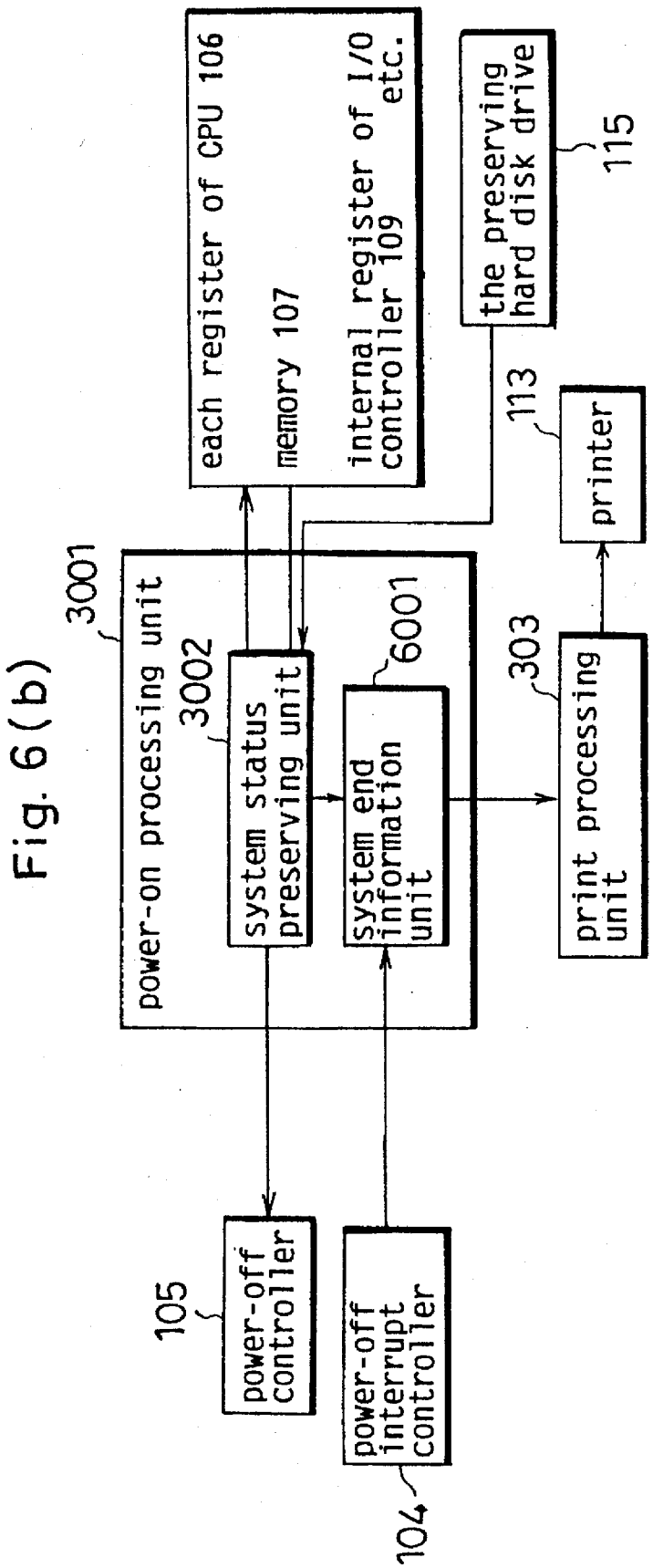

Fig. 17

| process | processing status | position in memory | size |
|---|---|---|---|
| processA | in use | 0x00100000 | 1000 bytes |
| processB | not in use | 0x00200000 | 2000 bytes |

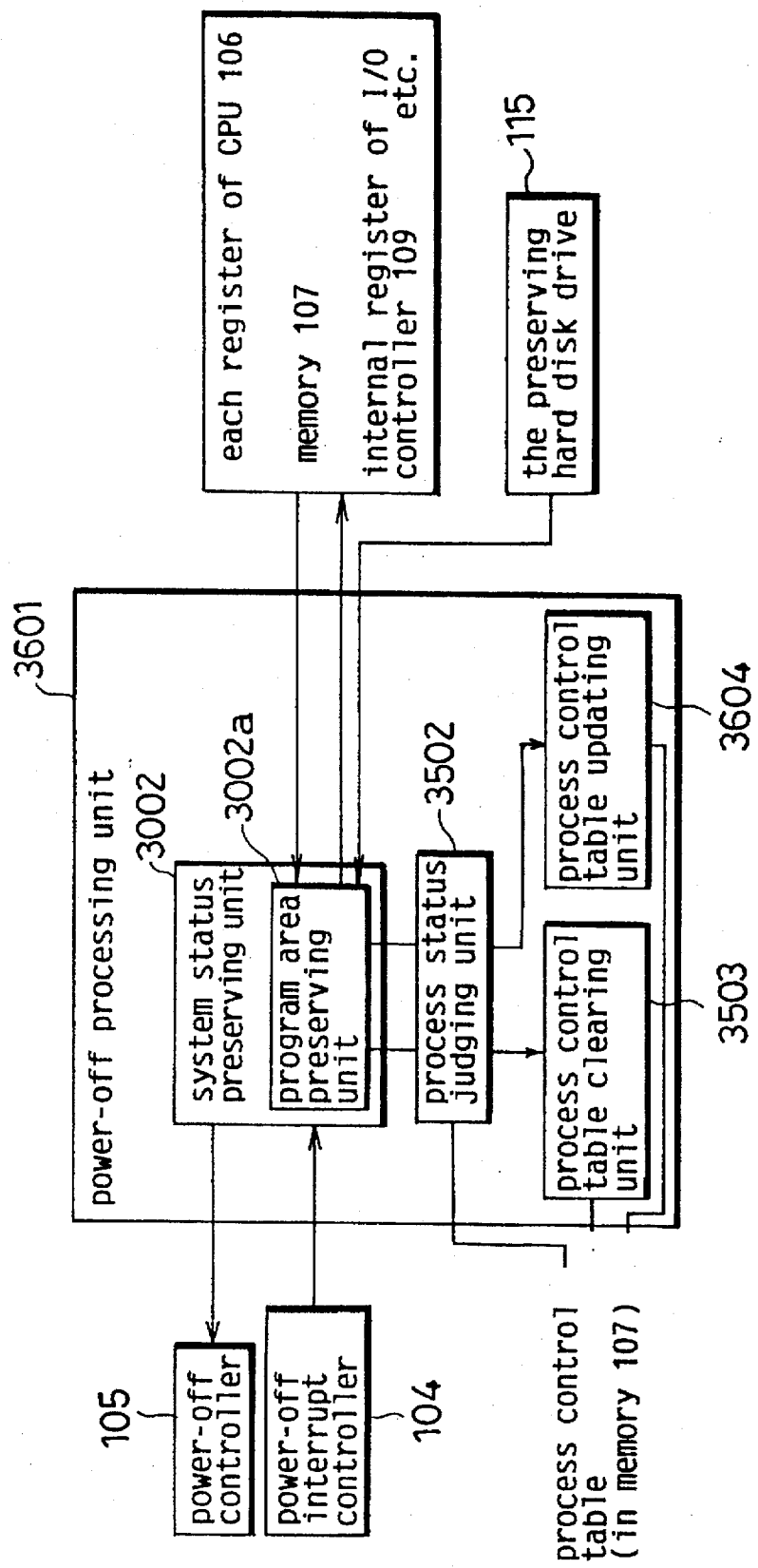

FIG. 21a

| process | processing status | storing place | modification | position in the memory | size |
|---------|-------------------|---------------|--------------|------------------------|------|
| processC | in use | memory | no | 0x00300000 | 15000 bytes |
| processD | in use | memory | yes | 0x00400000 | 20000 bytes |
| processE | in use | disk | no | 0x00500000 | 15000 bytes |
| processF | in use | disk | yes | 0x00600000 | 25000 bytes |

FIG. 21b

| process | processing status | storing place | modification | position in the memory | size |
|---------|-------------------|---------------|--------------|------------------------|------|
| processC | in use | disk | no | 0x00300000 | 15000 bytes |
| processD | in use | memory | yes | 0x00400000 | 20000 bytes |
| processE | in use | disk | no | 0x00500000 | 15000 bytes |
| processF | in use | disk | yes | 0x00600000 | 25000 bytes |

APPARATUS AND METHOD FOR SUSPENDING AND RESUMING SOFTWARE APPLICATIONS ON A COMPUTER

This is a continuation of prior application Ser. No. 07/895,131, filed on Jun. 8, 1992 U.S. Pat. No. 5,471,624 for an APPARATUS AND METHOD FOR SUSPENDING AND RESUMING SOFTWARE APPLICATIONS ON A COMPUTER.

BACKGROUND OF THE INVENTION (1) Field of the Invention

This invention relates to a method and apparatus for suspending and resuming the execution of an application program during a power off/on cycle, which are applied to computer systems such as personal computers and workstations.

(2) Description of the Related Art

In former computer systems, memory or registers provided to the systems could not hold data once the systems were powered off so that the previous status could not be resumed even when the systems were powered back on, if the power was turned off during the execution of a program.

Therefore, the user, when desired to power off during the operation and to restart it at a later time, needed to perform the operations as shown in FIG. 1 (a) and in the following, before powering off and after powering back on.

(Before powering off)

(1) Store the document being processed into a floppy disk
(2) Terminate the execution of the word processing program (After powering back on)

(3) Set the floppy disk and start the operating system from the beginning (for example, MICRO SOFT MS-DOS)
(4) Start the word processing program
(5) Retrieve the stored document to process Some of the recently developed portable personal computers named book type or notebook type have the function called resume function. This enables the user to restart his operation at the exact execution point at which it is suspended during a power off operation, thereby bypassing the above procedure. All the user has to do is to power off/on at any desired point as shown in FIG. 1(b).

Toshiba "DynaBook guide" says such a function is implemented by employing a battery built in the personal computer.

Such a personal computer seems to have a construction shown in FIG. 2 where a power unit 5006 having a battery 5008 is connected with an external power unit 5007 and a power switch 5112, and supplies power to a control board 5001, a display device 5105, an input device 5106, and an external storage unit 5005. The control board 5001 mounts a Central Processing Unit (CPU) 5101, a memory 5102, a display control unit 5002, an external storage controller 5003, and an input control unit 5004 thereon.

When the power switch 5112 is on, the power unit 5006 is supplied power from the external power unit 5007, and supplies the power to each unit of the personal computer and charges the battery 5008. If there is no supply from the external power unit 5007 (for example, not connected), it supplies power from the battery 5008 to each unit.

In contrast, when the power switch 5112 is off, the power unit 5006 supplies power from the battery 5008 only to the control board 5001 whether or not it is supplied power from the external power unit 5007. During this time, the entire operation of the personal computer appears to be off with no display on the display device 5105 and no operation in the external storage unit 5005.

However, the data necessary to resume the execution of a program which was running at the time it was powered off as those stored in the memory 5102 or registers in the CPU 5101 is retained even after the switch 5112 has been turned off because the control board 5001 is supplied power from the battery as mentioned.

When the user turns on the power switch 5112 again at a later time, the display device 5105, the input device 5106, and the external storage unit 5005 are supplied power by the power unit 5006, and the unit 5005 and other units are initialized. Consequently, the previous screen is again displayed on the display device 5105 based on the graphic data stored in the memory 5102, for example, the state before the powering off operation is resumed, thereby/enabling the user to restart his operation.

Some of the Large Scale Integrated Circuits (LSIs) which have been recently used as a CPU, a memory, or a control unit for an external unit have a mode called low power mode or sleeping mode in which the LSIs do not operate actively, but just hold data by consuming a small amount of power. Such LSIs can be used to more easily extend the period of time that data is retained after a powering off operation, by using them in the low power mode after the powering off, and in the normal power mode after a powering back on.

Disclosed in U.S. Pat. No. 4,907,150 and others is a construction in which data stored in a memory or registers in the CPU is transferred to another memory backed up by a battery even though the power supply to the CPU or the memory is stopped by powering off. According to this approach, it becomes easier to select a high-speed or compact device as CPU or memory, without considering power demand.

For some programs, however, it is inconvenient to have the previous execution which was running before the powering off operation resumed by the resume function. For example, the UNIX operating system in which the process of printer spooler deamon initiated by "lpd" command holds the data to be outputted from the application program and the like to the printer, has the following problems.

(1) When the printer is powered off, printing operation can not restart properly unless the contents of the mode setting registers in the printer and of registers indicating the printing position on the paper at that moment are also resumed at the powering back on.

(2) When the system has been powered off during mechanical operation, the previous status is not always resumed by electric control at the powering back on.

(3) When the printer is shared by other computer systems, the paper which was being printed by one of the systems is ejected at the time the printer is used by another, which makes it impossible to restart printing on the same paper.

The same problems develop in hard disk drives which hold data in the internal registers and have mechanical operations. Especially in the hard disk drives having a buffer memory called disk cache, the application program and the like complete the writing operation to the drives when the data has transferred to the cache, so that the writing operation can never be performed even through the process status of the program is resumed.

Furthermore, all of the computer systems having the above construction need batteries, thereby making it difficult to reduce reduce the product cost, weight, and size of the apparatus, and extend the capacity of the battery to retain the state in which a previous operation can be resumed.

Furthermore, such construction can not be applied to high-speed computer systems such as workstations, because they have a large power demand and many of the LSIs used for them do not have the above mentioned low power mode. Therefore, for example, a battery having the capacity to retain a resumable state of a personal computer for a week can retain that of a workstation only for an hour. Also, such computer systems having a large capacity of memory would require a large amount of power to retain the entire data in the low-demand memory to be transferred.

The limited resumable period of time creates a great restriction to the practical operations of workstations and other systems because they are mainly for business use so that it causes a severe damage to the users to lose stored data.

SUMMARY OF THE INVENTION

An object of this invention is to provide a method and apparatus capable of allowing a computer system to operate properly when the system has returned to the previous status.

The above object is achieved by a control unit of a computer system comprising a process resuming device for resuming the execution of the program it was running before the powering off operation by resuming the previous contents stored in a memory device containing registers in CPU, registers in input/output control units, and a volatile memory as they were before the powering off operation, a non-resumable condition judging device for judging whether the status of the computer system meets the substantially non-resumable condition or not, even though the stored contents in the storing device have been returned to the previous status at the powering back on, and a program execution control device for restarting the execution of a program from the beginning at the powering back on according to the judged results by the non-resumable condition judging device.

The above object is also achieved by a control method of a computer system comprising the steps of resuming the execution of the program it was running before the powering off operation by resuming the previous contents stored in a memory device containing registers in CPU, registers in input/output control units, and a volatile memory as they were before the powering off operation, judging whether the status of the computer system meets the substantially non-resumable condition or not though the stored contents in the storing device have returned to the previous status at the powering back on, and restarting the execution of a program from the beginning at the powering back on operation according to the judged results by the non-resumable condition judging device.

According to the above construction, the execution of programs is restarted from the beginning at the powering back on, so that troubles caused by the powering off operation during the execution can be eliminated.

Another object of this invention is to provide a method and apparatus having a storing device with a reduced capacity in which data necessary to resume a software application before powering off a computer system are stored.

The above object is achieved by a control unit of a computer system comprising a first storing device for holding programs even when the power is off, a second storing device for holding the programs and execution status information indicating the execution status of programs while the power is on, a third storing device for holding written data even when the power is off, a program loading device for loading the programs from the first storing device to the second storing device, a program execution status control device for, when a program is loaded to the second storing device, registering the execution status information corresponding to the program according to a powering off direction, when the execution is completed, setting information indicating the completion to the execution status information, when the program is deleted from the second storing device, deleting the information according to a powering off direction, and a power-off preserving device for deleting the information in the second storing device, transferring the non-set execution status information and the programs in the second storing device corresponding thereto to the third storing device, and powering off according to a powering off direction.

The above object is also achieved by a control unit of a computer system comprising the steps of loading the programs from the first storing device which holds the programs even when the power is off, to the second storing device which holds the programs and the execution status information indicating their execution status while the power is on, when a program is loaded to the second storing device, registering the execution status information corresponding to the program, when the execution is completed, setting information indicating the completion to the execution status information, when the program is deleted from the second storing device, deleting the information, and when powering off operation is directed, deleting the information in the second storing device, transferring the non-set execution status information and the programs in the second storing device corresponding thereto to the third storing device, and powering off.

According to the above construction, only a part of the programs held in the second storing device are transferred to the third storing device according to the executing status, which realizes the third storing device with a small storing capacity.

Another object of this invention is to provide a method and apparatus capable of suspending and resuming a software application running on a computer system during a power off/on cycle with no limit of the power off period, and of selecting devices such as a CPU applied to the computer system even without a low power mode, thereby reducing the size, weight, and producing cost of the computer system.

The above object is achieved by a control unit of a computer system comprising a first storing device for holding written data while the power is on, a second storing device for holding the written data even when the power is off, a power-off preserving device for powering off after transferring the data held in the first storing device to the second storing device when the powering off operation is directed, a non-resumable condition judging device for judging whether the status of the computer system meets a substantially resumable condition or not, though even the stored contents in the storing device have returned to the previous status at the powering back on, and a program execution control device for restarting the execution of a program from the beginning at the powering back on operation according to the judged results by the non-resumable condition judging device, wherein the second storing device includes a non-volatile storing device.

According to an I/O process such as the above construction, the data in the volatile memory device held before the powering off operation is retained without consuming any power so that the previous status, where it was before the powering off, can be resumed at the powering on operation regardless of the time period of power-off. Moreover, it becomes easier to reduce the size, weight, and producing cost of the computer system.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 (a)(b) is a block diagram showing the functional construction of the program routine of Embodiment 1.

FIG. 17 is an example of the process control table of Embodiment 4.

FIG. 20 is a block diagram showing the functional construction of the program routine of Embodiment 5.

FIG. 21 is an example of the process control table of Embodiment 5.

DESCRIPTION OF THE PREFERRED EMBODIMENT

<Embodiment 1>
(The construction of the hardware)

Figure 1:
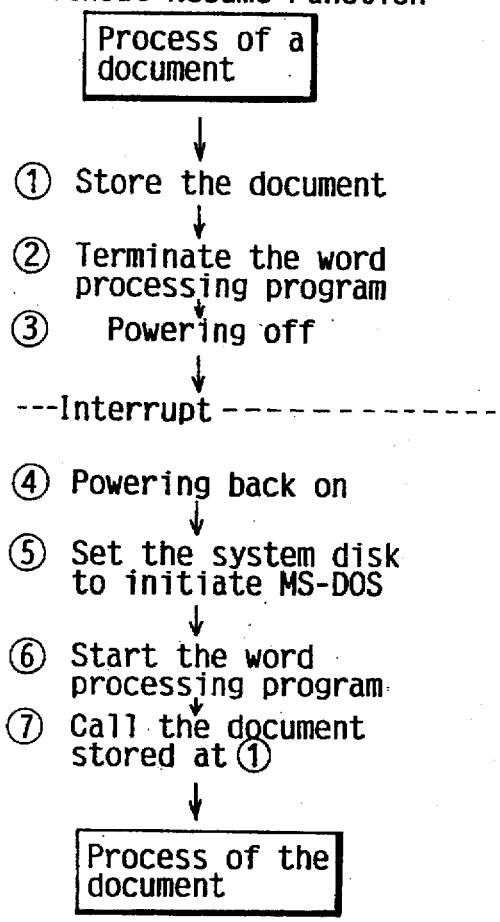
FIG. 1 (a)(b) shows examples of the operation of the user depending on the existence and nonexistence of the resume function of a computer system.
Figure 1:
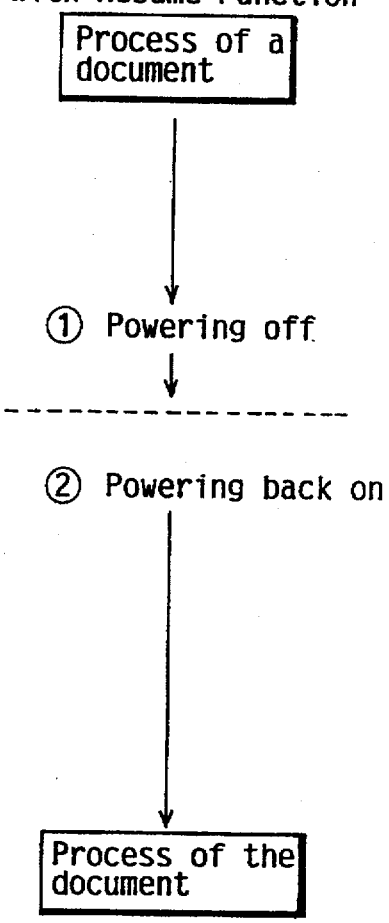
Figure 2:
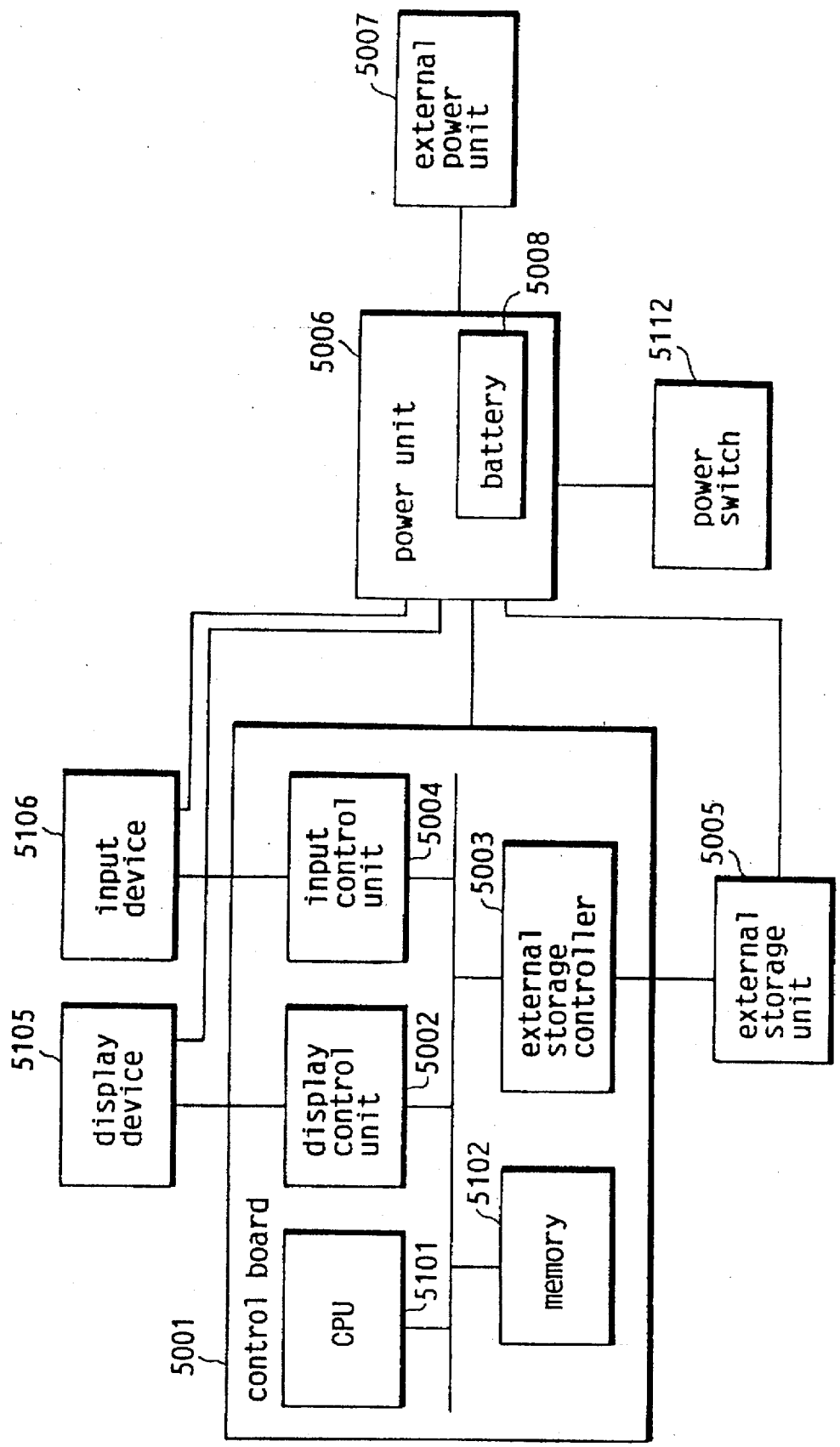
FIG. 2 is a block diagram of the surmised hardware construction of a conventional computer system.
Figure 3:
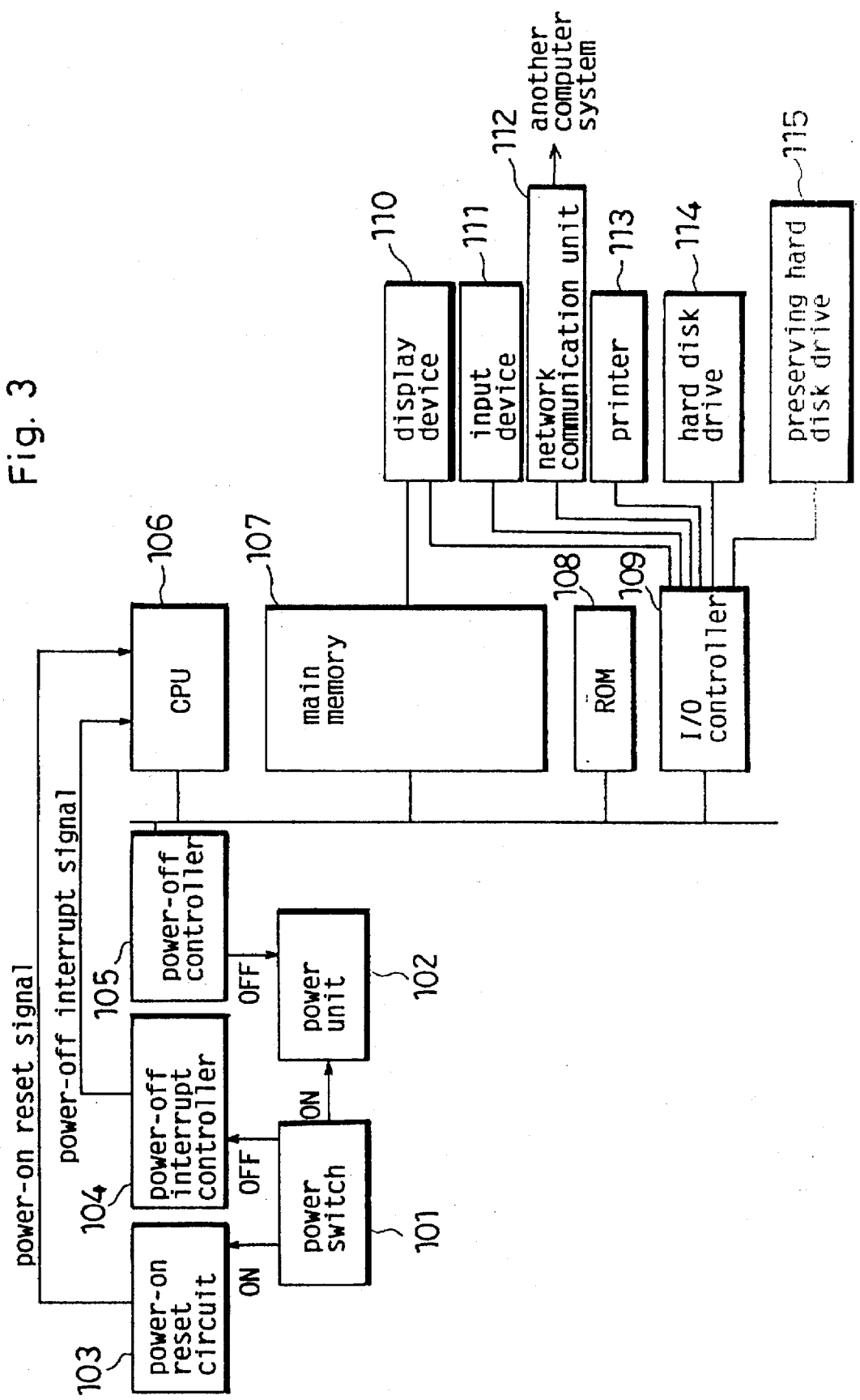
FIG. 3 is a block diagram of the hardware construction of the computer system of Embodiment 1.

The computer system of this embodiment is, as shown in FIG. 3, provided with a power switch 101, a power unit 102, a power-on reset circuit 103, a power-off interrupt controller 104, and a power-off controller 105.

The power switch 101 does not connect or disconnect the power line directly, but outputs on/off signals according to directions. The power unit 102 supplies power to each unit of the system when an on-signal is received from the power switch 101, and stops the supply when an overall off-signal is received from the power-off controller 105.

A CPU 106 is inputted both a power-on reset signal outputted from the power-on reset circuit 103 and a power-off interrupt signal outputted from the power-off interrupt controller 104. The computer system is also provided with a memory 107, a ROM 108, and an I/O controller 109, all of which, including the power-off controller 105 and the CPU 106, are connected with each other via bus lines.

The I/O controller 109 controls an display device 110, an input device 111, a network communication unit 112, a printer 113 a primary storing means such as, a hard disk drive 114, and a temporary storing means such as a preserving hard disk drive 115 to control data input/output operations among these units. The graphic data to display images on the display device 110 is sent from the memory 107. The I/O controller 109 is provided with internal registers, including a baud rate register for holding information indicating the communication speed with the input device 111, and a Hard Disk (HD) transfer mode register for holding information indicating the data is transferred to/from the hard disk drive 114 on synchronous mode.

(The construction of a register set in CPU 106)

Figure 4:
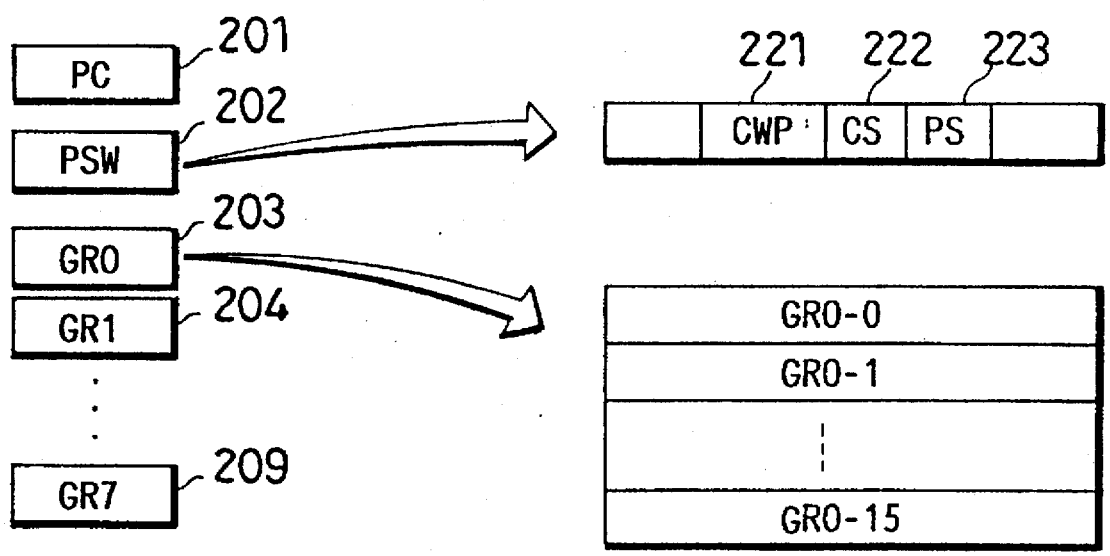
FIG. 4 is an illustration showing the construction of the register set in the CPU of Embodiment 1.

The CPU 106 is, as shown in FIG. 4, provided with a program counter (PC) 201, a resister for a processor status word (PSW) 202, general purpose register groups (GR) 203–209, each of which consists of 16 registers. The PSW 202 includes these fields holding a current window pointer (CWP) 221 indicating the GR in use among the GR 203–209, holding a current status (CS) 222 indicating the current mode state of the CPU 106, and holding a previous status (PS) 223 indicating the mode state of the CPU 106 at the time an interruption has occurred. The above mode includes a supervisor mode in which the execution of privileged instructions, or memory accesses associated with the system control is allowed, and a user mode in which the execution is not.

(The memory map of the memory 107)

Figure 5:
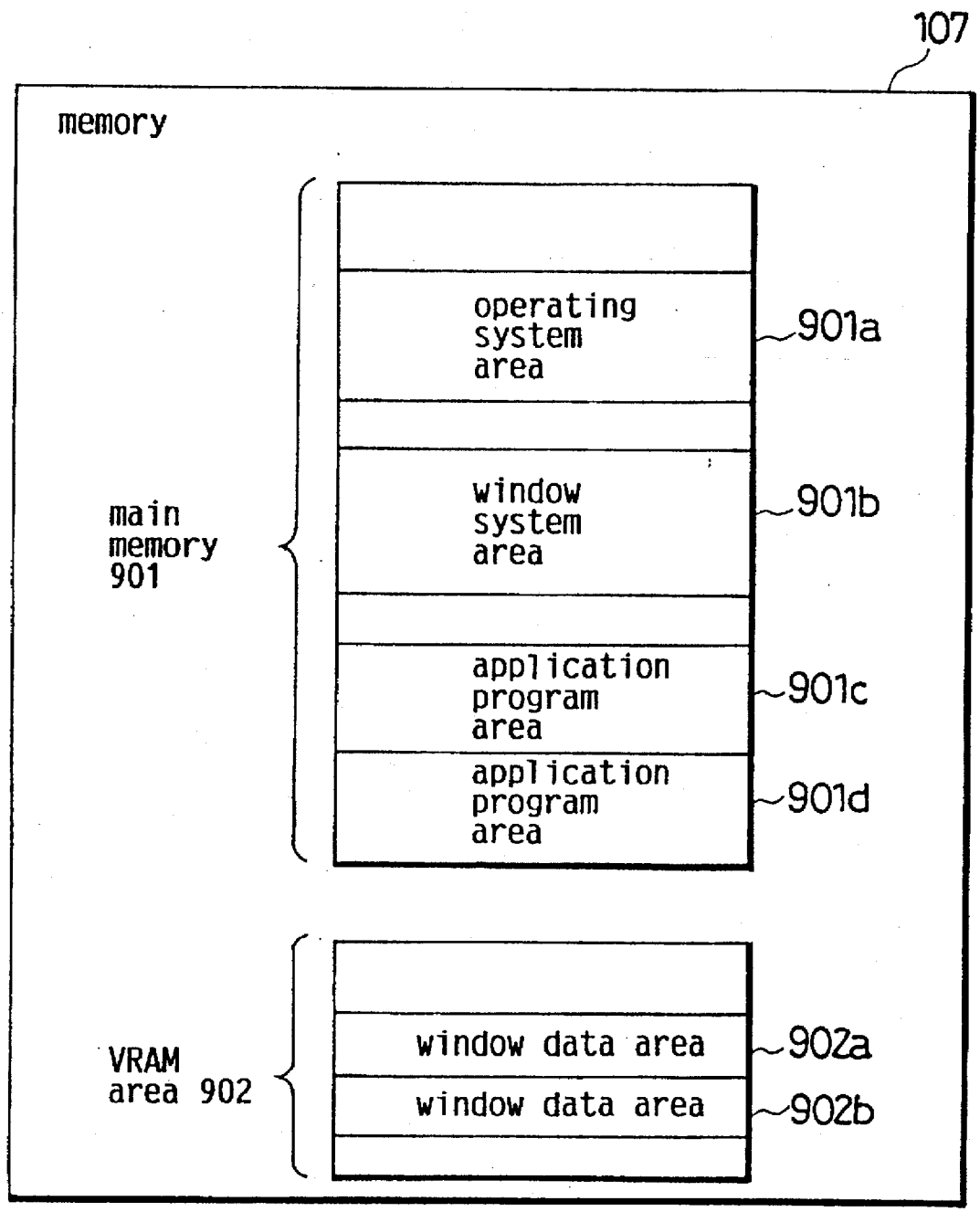
FIG. 5 is an example of the memory map of the memory of Embodiment 1.

In the memory 107 a RAM, a memory 901 and a VRAM area 902 are reserved as shown in FIG. 5.

The memory 901 includes an operating system area 901a, a window system area 901b, and an application program areas 901c/901d . . . In the operating system area 901a, operating system programs, a memory management table for managing the use of the memory 107, a process control table for managing the state of a running program, and the like are stored. In the window system area 901b, window system programs, various data, including the number of the windows opened or indicated on the display device 110, and the sizes and positions of each window are stored. In the VRAM area 902, window data areas 902a/902b . . . and the like, which hold the graphic data of the images displayed on a window are reserved when the window is opened.

(The functional construction of the program routine)

The computer system operates by the execution of the program routine stored in the memory 107 or the ROM 108. This routine is divided into functional units to make the description easier.

As shown in FIG. 6, a power-off processing unit 3001 is initiated by the input of a power-off interrupt signal sent from the power-off interrupt controller 104, and directs the power-off controller 105 to output a power-off reset signal after a system status preserving unit 3002 has stored the execution data held in volatile data locations such as each register of the CPU 106, the memory 107, the internal registers of the I/O controller 109, or the like to the preserving hard disk drive 115. The unit 3001 also sends control information to a print processing unit 303, which enables the printer 113 to restart a printing operation at the powering back on operation even though the power-off operation occurred during its operation. To perform this control, the power-off processing unit 3001 has the construction shown in FIG. 6(b).

The system end informing unit 6001 is initiated by sending an interrupt signal from the power-off interrupt controller 104, and transfers control to the system status preserving unit 3002 which processes as set forth above after sending the system end information to the print processing unit 303.

The unit 303 generally controls the printer 110 as a printer spooler deamon independently of the process of the other programs.

The unit 303 holds the data to be outputted from the application processing unit and the like to the printer 113 in the reserved area of the memory 107, and outputs the data according to the operating speed of the printer 113. If the system end information is sent before the completion of the data output, the print processing unit 303 resets a printer outputting flag which indicates that data is being outputted to the printer 113 when it is set in the reserved area of the memory 107 and that data has not been outputted yet when it is reset. The data to be outputted to the printer 113 and the printer outputting flag are preserved to the preserving hard disk drive 115 at the powering off operation, and resumed at the powering back on operation so that the print processing unit 303 outputs the data to be outputted to the printer 113 again from the beginning.

A power-on processing unit 4001 is initiated by sending a power-on reset signal from the power-on reset circuit 103, and transfers control to the routine which was running at the time the powering off operation, after a system status resuming unit 4002 has set the data stored in the preserving hard disk drive 115 to each of the registers in the CPU 106 and another unit. The unit 4001 also sends, if necessary, control information to a process control unit 301 for managing the process of an application program in execution, to a window system processing unit 302 for managing the data displayed on the display device 110, and to the print processing unit 303 in order to avoid the troubles caused from resuming the status at the state it was at before the powering off.

The description of the other units is omitted because they are the same as those provided in the conventional computer systems. They include the following units: a boot processing unit for activating the system at the time of the powering on operation without resuming the data saved to the preserving hard disk drive 115, an initializing processing unit for initializing the I/O controller 109 and the like, an operating system processing unit for executing an operating system program, an application processing unit generated by loading an application program.

The operation of the computer system having the above construction is described as follows.

(Interrupt operation)

Interrupt operations are closely related with the operation of the power-off processing unit 3001 and the power-on processing unit 4001. They are initiated sending an interrupt signal such as the power-off interrupt signal to the CPU 106 or by the execution of a software interrupt instruction.

When an interruption has occurred, the CPU 106 performs the following internal procedure before transferring control to the interrupt processing program.

(1) Shift the GR in use by incrementing the value of the CWP 221 for the interrupt process program in order to save the value of each register of the GR used before the interruption.

(2) Save the value of the PC 201 at the point of the interruption which indicates the address of the area in which the instruction to be retrieved next is preserved, for example, by moving to the 16th register of the GR indicated by the CWP 221. The value of PC 201 may be pushed to a stack.

(3) Move the value of the CS 222 to the PS 223, and transfer control to the interrupt processing program. More precisely, the CPU 106 sets the execution starting address of the interrupt processing program predesignated according to the types of the interrupt signals or the like to the PC 201 and executes the interrupt processing program by the instruction stored in the address area.

The process which was being executed before the interruption is resumed by the execution of the interrupt returning instruction in the interrupt processing program.

The CPU 106 carries out the following internal procedure to return to the state where it was before the interruption occurred.

(1) Move the value of the PS 223 back to the CS 222 to retrieve its original value (the mode of the CPU is returned to the original).

(2) Move the address stored in the 16th register of the GR indicated by the CWP 221 to the PC 201.

(3) Decrement the value of the CWP 221 so that the GR used before the interruption occurrence can be used.

Thus, the CPU 106 returns to the previous status where it was before the interruption and resumes the execution according to the instructions stored in the address area indicated by PC 201.

(The operation performed subsequent to the powering on when the state of the system is not preserved)

Figure 7:
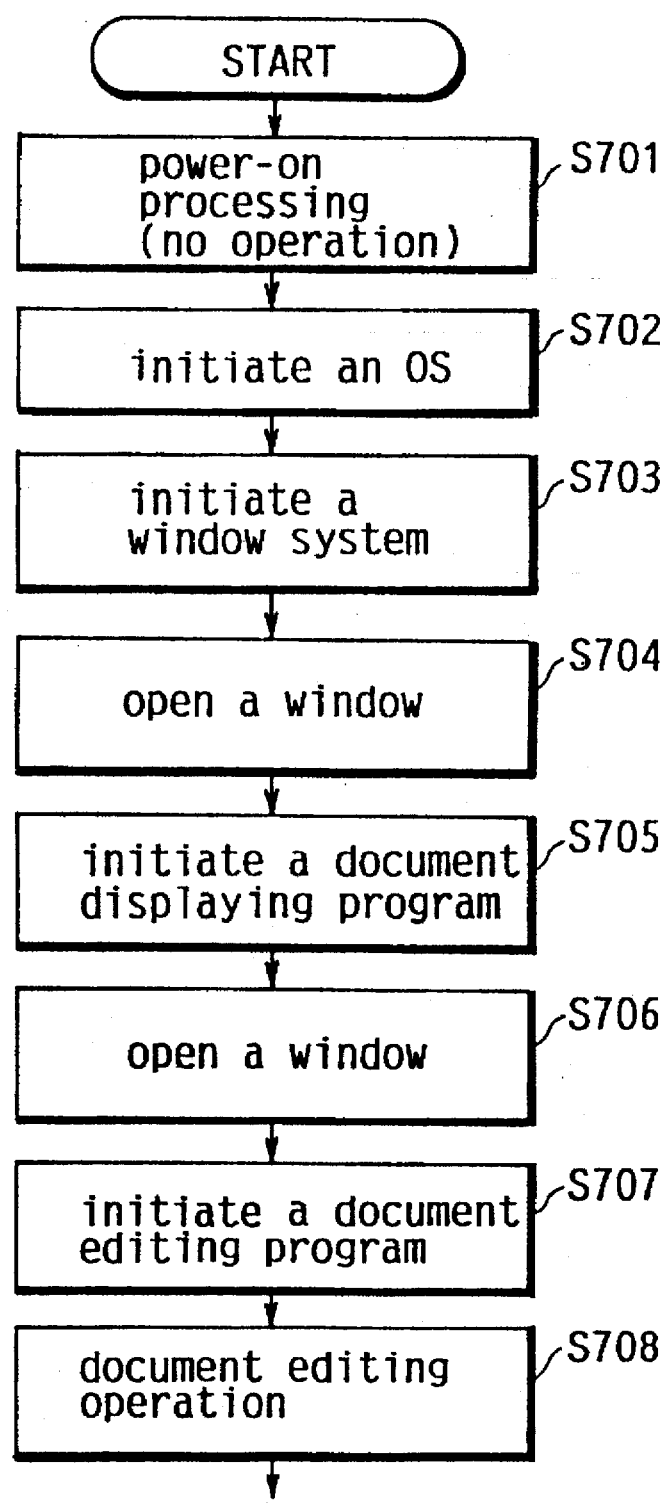
FIG. 7 is a flow chart depicting the operation performed at the powering on when the system status of Embodiment 1 is not preserved.

The computer system of this embodiment can be powered off without preserving the system status as described below. The operation of displaying and editing a document at the powering back on operation at a later time is described with reference to FIG. 7.

By turning the power switch 101 on, the power-on reset circuit 103 outputs a power-on reset signal, and the power-on processing unit 4001 is initiated ($701). The unit 4001 transfers control to the boot processing unit without initiating the system status resuming unit 4002 after confirming that the system status was not preserved in the preserving hard disk drive 115 at the previous powering off operation by checking the value of a resumable flag 601 stored in the drive 115 as described later. The boot processing unit initializes the I/O controller 109 and other units by initiating the initializing processing unit, loads the operating system program from the hard disk drive 114 to the operating system area 901a, and transfers control to the operating system processing unit (S702). At this time, the operating system processing unit accepts input from the user.

According to the direction of the user to initiate the window system, the operating system processing unit loads the window system program to the window system area 901b to initiate the window system processing unit 302 (S703).

Figure 8:
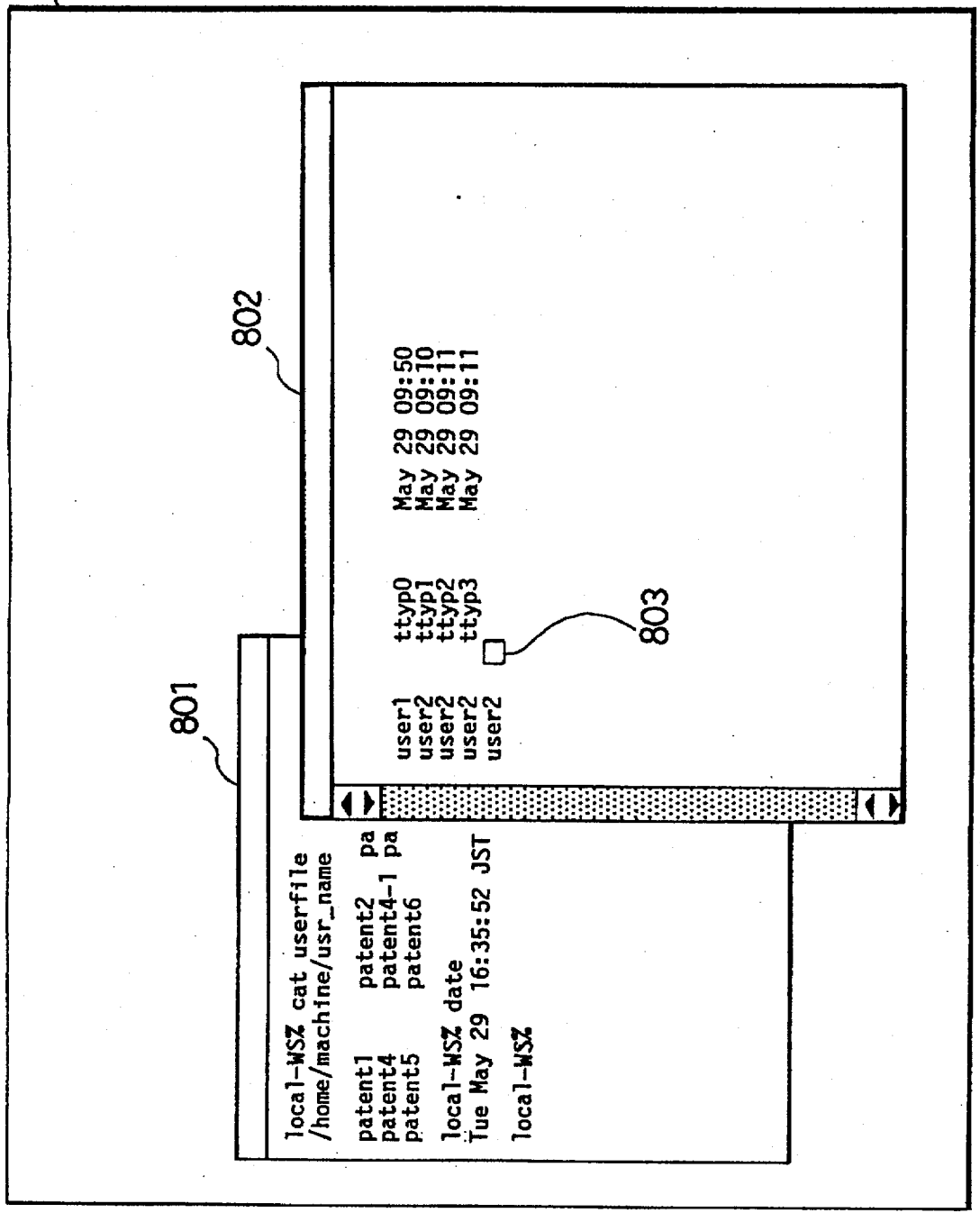
FIG. 8 is an illustration showing an example of the display on the display device of Embodiment 1.

According to the direction of the user to open a window, the window system processing unit 302 displays a window 801 as shown in FIG. 8 (S704). At this time, the unit 302 stores the data, including the position and size of the window 801, into the window system area 901b, and reserves a window data area 902a holding the graphic data of the images displayed on the window 801 in the VRAM area 902.

According to the direction of the user to initiate a document display program within the window 801, the operating system processing unit reserves an application program in area 901c, and loads the application program from the hard disk drive 114 in order to initiate the application processing unit (S705). According to the direction of the user to display a document preserved in the hard disk drive 114 the application processing unit displays the document within the window 801 by writing the graphic data to the window data area 902a.

According to the direction of the user to open another window, the window system processing unit 302 displays the window 802 in the same manner as (S704), stores the data including the position and size of the window 802 into the window system area 901b, and reserves the window data area 902b holding the graphic data of the images displayed on the window 802 in the VRAM area 902 (S706).

According to the direction of the user to initiate a document editing program within the window 802, the operating system processing unit reserves an application program area 901d in the same manner as the (S705), loads an application program from the hard disk drive 114, and initiates the application processing unit (S707).

According to the various directions of the user to edit a new document displayed on the window 801, the application processing unit processes the document editing, and displays it on the window 802 (S708) by writing the graphic data to the window data area 902b.

A curser 803 appearing on the window 802 in FIG. 8 indicates the displaying position of a character sent from the input device 111.

(The operation performed before powering off with preserving the system status)

Figure 9:
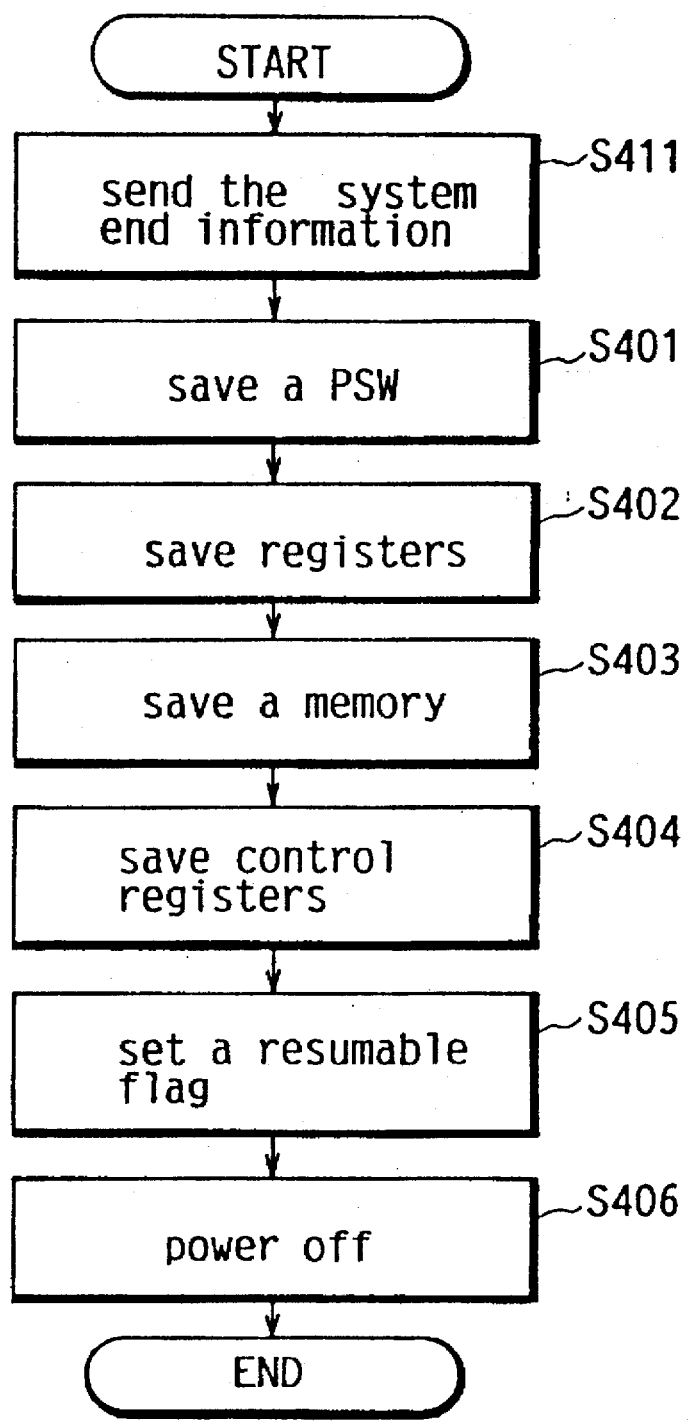
FIG. 9 is a flow chart depicting the operation performed at the powering off after the system status of Embodiment 1 has been preserved.

As shown in FIG. 9, when the power switch 101 is turned off, the power-off interrupt controller 104 outputs a power-off interrupt signal, by which the power-off processing unit 3001 is initiated described before, regardless of the status of the application program or the like, and starts the system end informing unit 6001. The unit 6001 sends the system end information to the print processing unit 303 (S411). At that time, if the output of the data to be outputted from the application processing unit and the like to the printer 113 has not been completed, the unit 303 resets the printer outputting flag corresponding to the request. The system end informing unit 6001 transfers control to the system status preserving unit 3002.

Figure 10:
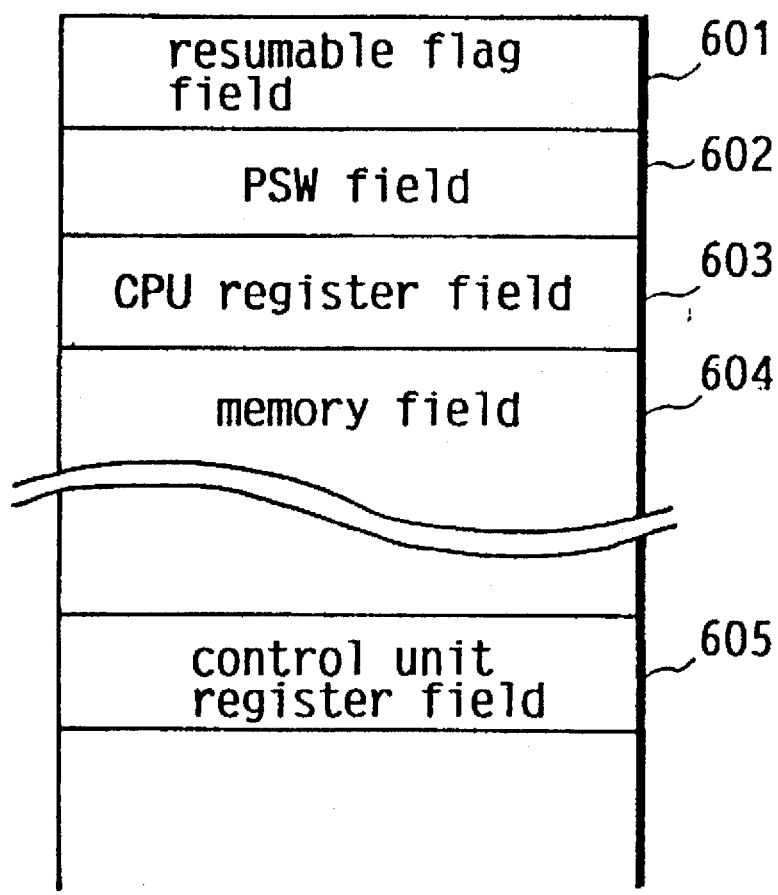
FIG. 10 is an illustration showing the memory map of the preserving hard disk of Embodiment 1.
Figure 11:
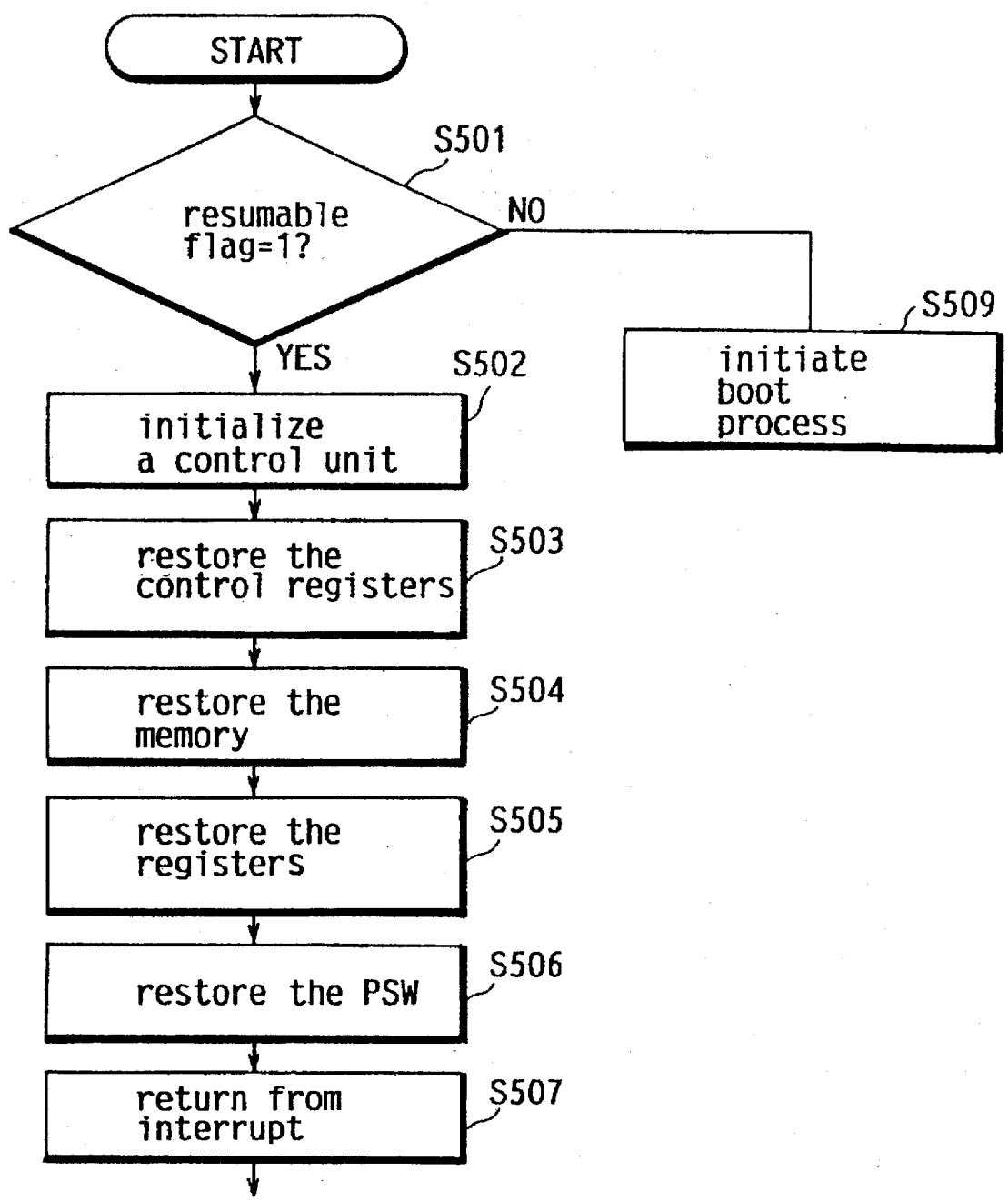
FIG. 11 is a flow chart depicting the operation performed at the powering on when the system status of Embodiment 1 is not preserved.

The unit 3002 preserves the contents of the PSW 202 and the CPU 106 to the PSW field 602 of the preserving hard disk drive 115 shown in FIG. 10 (S401), and the contents of the GRs 203–209 to the CPU register field 603. The address in the PC 201 is not stored because it is not needed to resume the system status. The address to be set in the PC 201 to resume the system status where it was before the powering off operation is held in the 16th register of GR by the internal procedure at the time of interruption.

Next, the unit 3002 stores all the contents of the memory 107 to the memory field 604 (S403). Only the contents in the areas reserved by the operating system processing unit, application processing unit or the like may be designed to be stored to the preserving hard disk drive 115 with reference to the memory control table held in the operating system area 901a.

The unit 3002 also stores the data necessary to resume the system status among those held in the internal register in the I/O controller 109 or the like to the control unit register field 605 (S404).

Later, the unit 3002 sets the value of the resumable flag field 601 to 1 in order to indicate that the system status is preserved, and returns control to the power-off processing unit 3001.

The unit 3001 directs the power-off controller 105 to output a power-off signal. The power-off controller 105 outputs it to the power unit 102 which accordingly stops power supply to each unit of the computer system (S406). (The operation performed subsequent to the powering on when the system status is preserved)

As shown in FIG. 9, when the power switch 101 is turned on, it outputs a power-on signal to the power unit 102 and to the power-on reset circuit 103. The power unit 102 supplies power to each unit of the system. The power-on reset circuit 103 outputs a power-on reset signal to initiate the power-on processing unit 4001.

The unit 4001 first judges whether the value set in the resumable flag field 601 is 1 or not (S501).

If it is not, the unit 4001 passes control to the boot processing unit without starting the system status resuming unit 4002, and loading of the operating system program and the like is performed as described before (S509).

If it is 1, the unit 4001 first initiates the initializing processing unit to initialize the I/O controller 109 and the like (S502).

Then, the unit 4001 passes control to the system status resuming unit 4002 which subsequently reads the contents preserved in the control unit register field 605 of the preserving hard disk drive 115 in order to set them in the appropriate internal register of the I/O controller 109 or the like (S503).

The system status resuming unit 4002 reads the contents preserved in the memory field 604 to store them to the memory 107 (S504). Since the window system area 901b and the window data areas 902a/902b are resumed at this time, the display device 110 reads graphic data from the memory 107 and displays the previous images which were being displayed before the powering off operation.

The unit 4002 subsequently reads the contents of the GRs 203–209 stored in the CPU register field 603 and sets them to the corresponding GRs 203–209 (S505).

The unit 4002 next reads the contents of the PSW 202 stored in the PSW field 602, sets them to the PSW 202 (S506) and returns control to the power-on processing unit 4001.

At this point, the status of the computer system is returned to the previous status where it was when the power-off processing unit 3001 performed an interrupt process at the powering off operation. By executing the interrupt instruction in the power-on processing unit 4001, the computer system returns to the previous status where it was before the power-off interrupt signal was sent. Thus, execution of the application processing is resumed (S507).

The print processing unit 303 outputs the data to be outputted to the printer again from the beginning because the printer outputting flag is reset at the powering off as mentioned before.

Thus, the data necessary for resuming the system status, including the contents of the PSW 202 and GRs 203–209, the contents of the memory 107, and the contents of the internal register of the I/O controller 109 which were stored to the preserving hard disk drive 115 before the powering off operation are read therefrom and set to the registers and the like, thereby resuming the previous operation which was running before the powering off operation.

Since the preserving hard disk drive 115 preserves data without power supply, there is no limit to the period of time before the next powering on operation. For obtaining the same effects, a non-volatile memory, such as an electrically erasable PROM (EEPROM) and a flash memory, a magneto-optic disk drive, and a magnetic tape drive can be used instead of a hard disk drive.

(The operation performed before powering off when the system status is not preserved)

Figure 12:
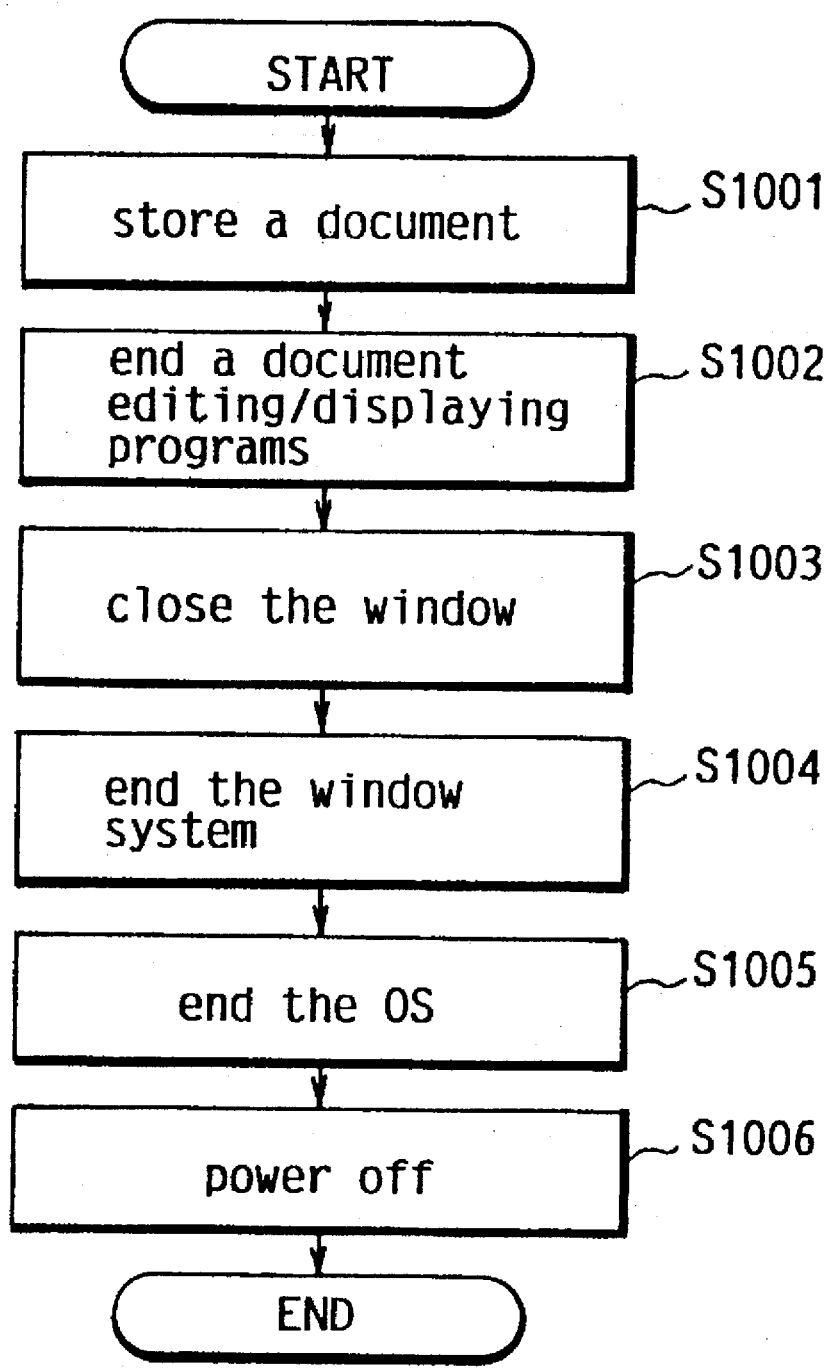
FIG. 12 is a flow chart depicting the operation at the powering off when the system status of Embodiment 1 is preserved.

As shown in FIG. 12, when the computer system is powered off without saving the system status, it must be returned to the initial status as follows.

To prevent the system status from being preserved at the power off, the power-off processing unit 3001 is exchanged with another unit to direct the power-off controller 105 to output an off-signal without initiating the system status preserving unit 3002. More specifically, the instructions to direct the output of an off-signal or the like may be written in the address area where the execution starts when a power off interrupt has occurred.

The application processing unit stores the document in operation to the hard disk drive 114 according to the direction of the user (S1001), and ends the editing process and displaying process of the documents (S1002). At this time, the application program areas 901c/901d are released, and control is passed to the window system processing unit 302.

The unit 302 closes the windows 801 and 802 (S1003) to end the window system process according to the direction of the user (S1004). At this time, the window system area 901b and the window data areas 902a/902b are released, consequently control in transferred to the operating system processing unit. The operating system processing unit ends the operating system process according to the direction of the user (S1005). At this time, the operating system area 901a is released and the computer system can only start the operating system processing unit according to the direction of the user and the powering off processing unit 3001 according to the powering off interrupt signal.

Consequently, when the power switch 101 is turned off, the power-off processing unit 3001 sets the value of the resumable flag field 601 to 0 in order to indicate that the system status is not preserved, and directs the power-off controller 105 to output a power-off signal so that the power unit 102 stops power supply.

<Embodiment 2>

Figure 13:
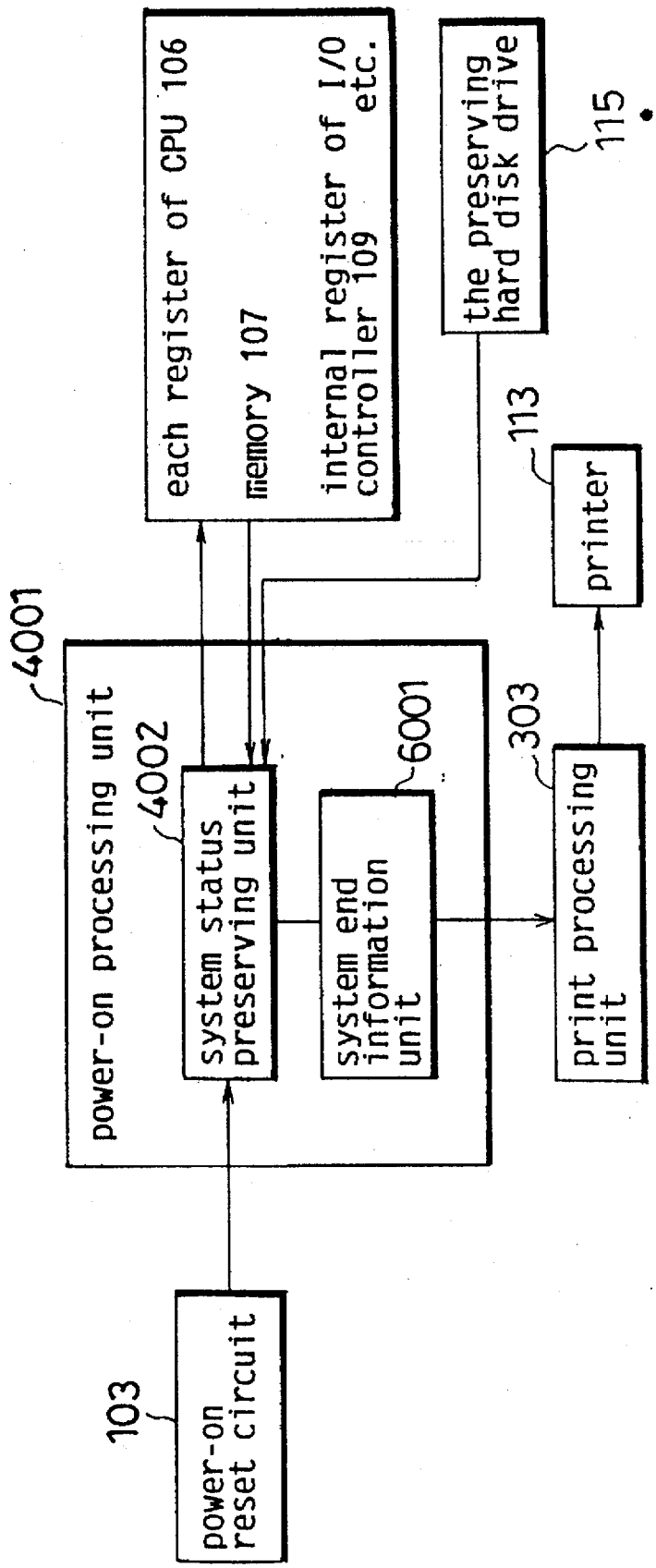
FIG. 13 is a block diagram showing the functional construction of the program routine of Embodiment 2.

This embodiment differs from Embodiment 1 in the functional construction of a program routine in which a system end informing unit 6001 shown in FIG. 13 is in the power-on processing unit 4001 and not provided in the power-off processing unit 3001.

In the power-off processing unit 3001, as soon as the power-off interrupt signal is sent, the system status preserving unit 3002 is started and the status is preserved to the preserving hard disk drive 115.

On the other hand, in the power-on processing unit 4001, when the power-on reset signal is inputted, the system status resuming unit 4002 is started. The unit 4002 sets the date stored in the drive 115 to each register 201 . . . of the CPU 106 or the like. At that time, the status is resumed in accordance with in which the printer outputting flag.

The system status resuming unit 4002 transfers control to the system end informing unit 6001 after the system status has been resumed. The unit 6001 sends the system end information to the print processing unit 303 to reset the printer outputting flag. Then, the system end informing unit 6001 transfers control to the routine which was running before the powering off, and as a result, the print processing unit 303 outputs the data to be outputted to the printer again from the beginning.

In addition to the print processing described in Embodiments 1 and 2, the approach of restarting an I/O process from the beginning at the powering back on can be applied to a readout processing from a hard disk drive 114, a magnetic tape drive, or to the communication processing in which the computer system of this side has control among those via the network communication unit 112 or a modem.

Also, when there are a number of processing operations which need to send the system end information among the processing operations executed by computer systems, the information indicating these operations may be pre-held as a table depending on which the system end information can be sent.

Also, judging whether either of the operations is in execution can be performed by the process control table controlled by the process control unit 301, or the communication status table indicating the communication status of the computer system so that the system end information is only sent the operation which is in execution.

<Embodiment 3>

Figure 14:
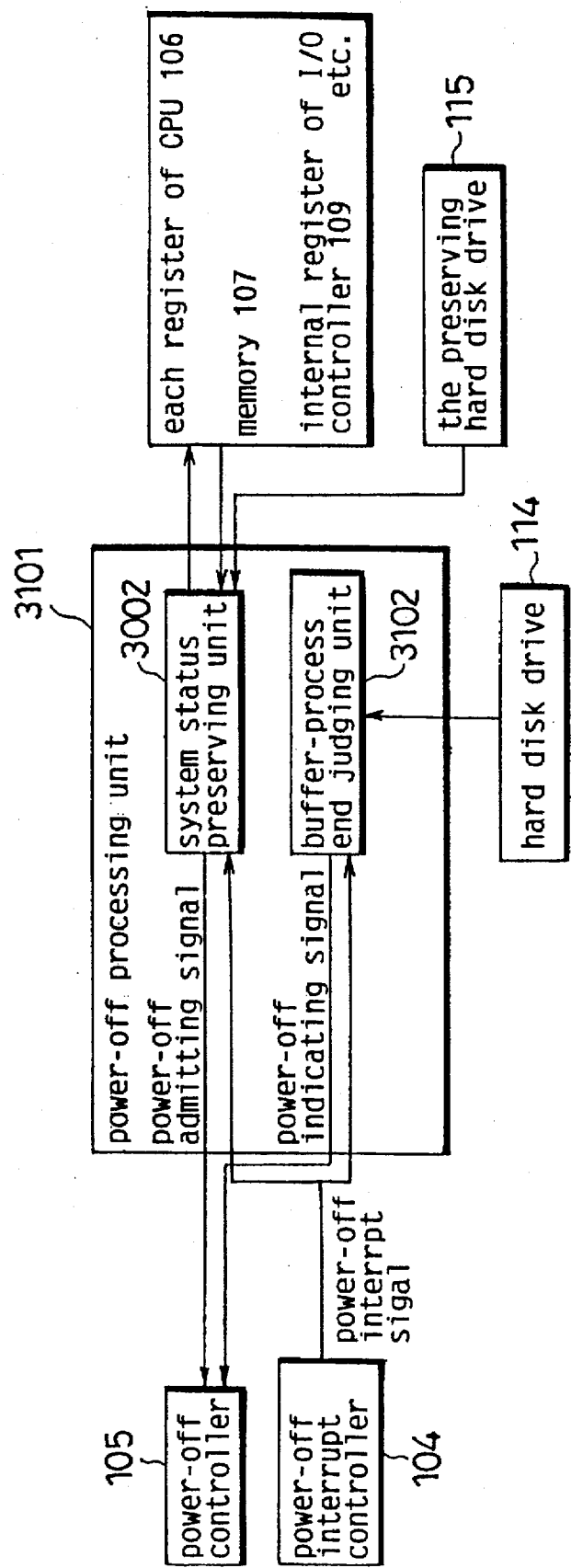
FIG. 14 is a block diagram showing the functional construction of the program routine of Embodiment 3.

This embodiment, like Embodiment 2, differs from Embodiment 1 in the functional construction of program routine in which a power-off processing unit 3101 shown in FIG. 14 is provided instead of the power-off processing unit 3001.

According to the computer system of this embodiment, when a process is running for which it is inconvenient to power off during the execution, the powering off operation is done after the completion of the process. Such control can be applied to the print processing, and is especially effective in short processing operations and those which can not be restarted from the beginning. This embodiment describes the processing operation to store data to the hard disk drive 114 having a buffer (disk cache). The power-off processing unit 3101 is provided with a buffer process end judging unit 3102, which is started with the system status preserving unit 3002 by the power-off interrupt signal.

Figure 15:
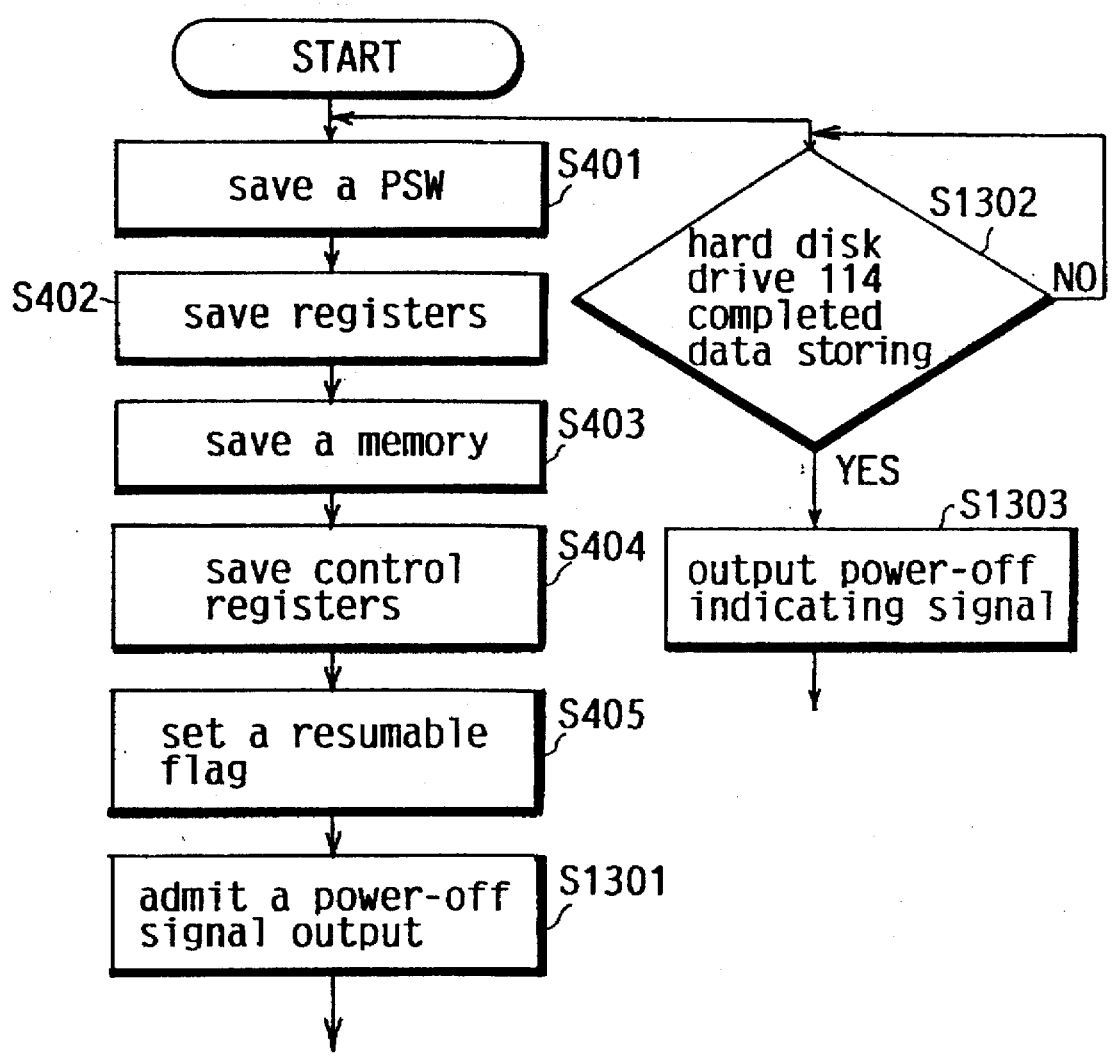
FIG. 15 is a flow chart depicting the operation performed when the power switch of Embodiment 3 has been turned off.

As in Embodiment 1, the system status preserving unit 3002 performs such a processing operation as preserving the system status (S401)–(S405) as shown in FIG. 15 except that it outputs a power-off admitting signal instead of directing the power-off controller 105 to output the off-signal (S1301).

The buffer process end judging unit 3102 checks if the data held in a buffer of the hard disk drive 114 has been stored (S1302), and when it has, outputs the power-off signal to the power-off controller 105 (S1303).

After receiving both the power-off indicating signal and the power-off admitting signal, the power-off controller 105 outputs the off-signal to the power unit 102 to stop the power supply.

Thus, the powering off operation is done after the data in the buffer built in the hard disk drive 114 has been processed.

The buffer process end judging unit 3102 may be designed to output the power-off indicating signal when initiated by the interrupt signal from the hard disk drive 114 instead of incessantly checking it, or to be initiated after the system status preserving unit 3002 has completed its preserving operation.

<Embodiment 4>

Figure 16:
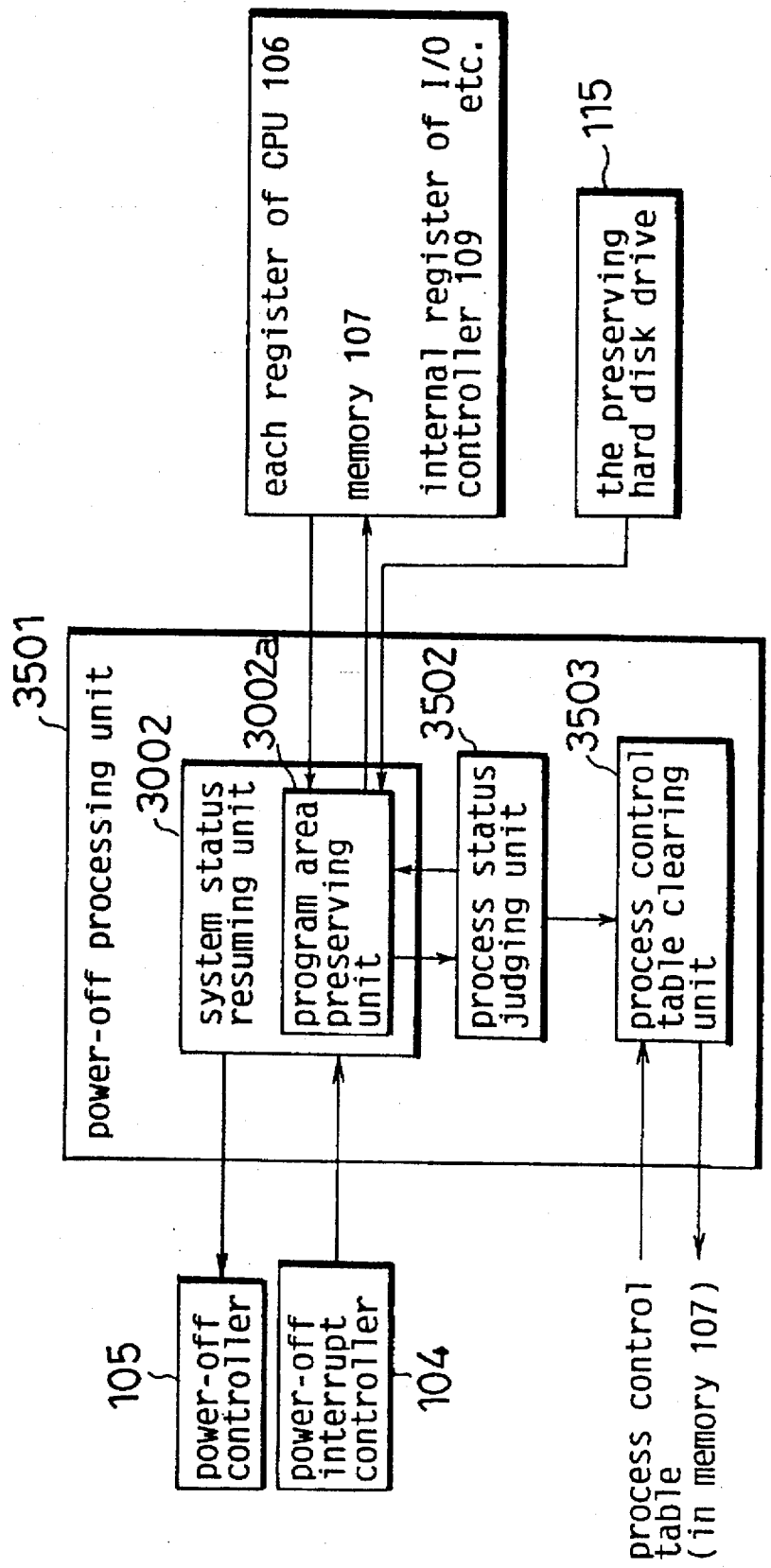
FIG. 16 is a block diagram showing the functional construction of the program routine of Embodiment 4.

This embodiment, like Embodiment 2, differs from Embodiment 1 in the functional construction of program routine in which a power-off processing unit 3501 shown in FIG. 16 is provided instead of the power-off processing unit 3001.

The management of the memory 107 related to the processing of the application program and the like, is described as follows using UNIX as the operating system.

When the program processing is started, program areas such as the application program area 901c are reserved in the memory 107, and programs are loaded to the reserved areas from the hard disk drive 114. At that time, the head address and the program size of the program areas are registered in the process control table in the operating system area 901a like process A shown in FIG. 17.

When the application program processing has been completed, the information indicating the processing status of the process control table is changed to a "not in use" status, maintaining the reserved program areas. When the same program processing is started again, the loading of the program is bypassed. The program areas which are "not in use" are released when there is no more free space left in the memory 107.

The programs in the program areas which are "not in use" are not always restarted and can be restarted by loading the programs again even though the programs have been restored.

Therefore, according to the computer system of this embodiment, the program areas which are "not in use" are not stored to the preserving hard disk drive 115 at the powering off so that the drive 115 does not need to have a large capacity.

(Detailed construction of the power-off processing unit 3501)

A process status judging unit 3502 of the power-off processing unit 3501 is started by a program area preserving unit 3002a of the system status preserving unit 3002 to check the process control table. When the information indicating the processing status is "in use", the process control table directs the unit 3002a to store the contents held in the program areas to the preserving hard disk drive 115. On the other hand, when it is "not in use", the process control table directs a process control table clearing unit 3503 to clear the register contents concerning the processing. The process control unit 301 may be designed to direct the release of the program area.

(The operation performed after the power switch 101 is turned off)

Figure 18:
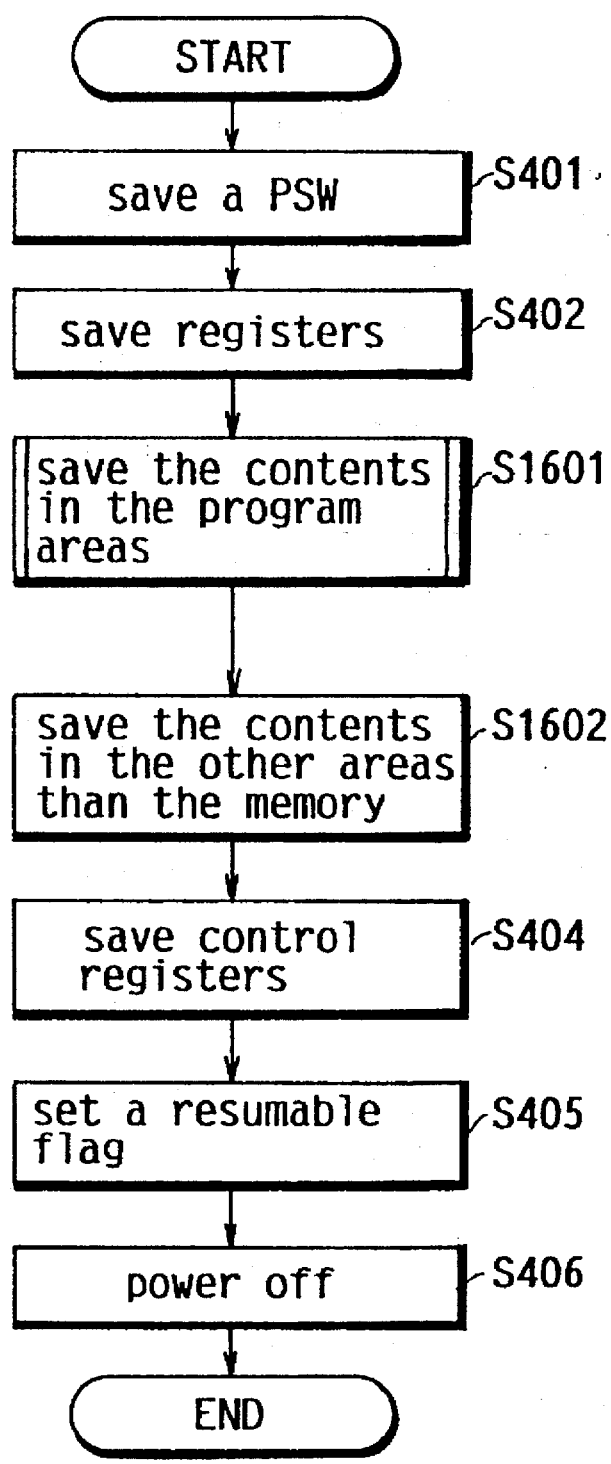
FIG. 18 is a flow chart depicting the operation performed when the power switch of Embodiment 4 has been turned off.
Figure 19:
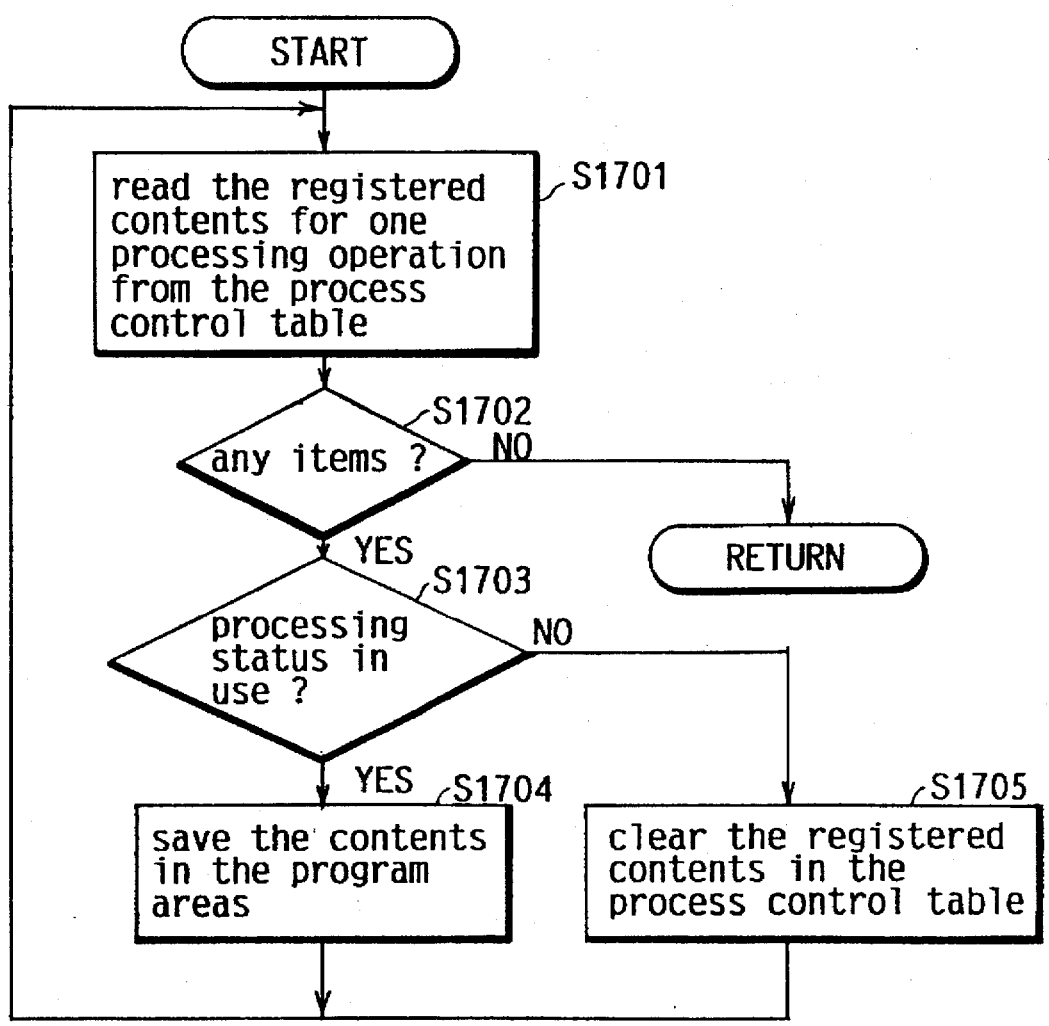
FIG. 19 is a flow chart depicting the detailed operation performed when the contents of the program areas of Embodiment 4 is stored.

As shown in FIG. 18 and 19, when the power switch 101 is turned off, the power-off processing unit 3501 is started as interrupt processing like in Embodiment 1. The unit 3501 stores the contents of each register of the CPU 106 to the preserving hard disk drive 115 (S401)(S402), and then stores the contents of the program areas (S1601). More specifically, as shown in FIG. 19, it reads the register contents for one processing operation from the process control table (S1701), and checks if the read contents are terminators or not (S1702), and if they are, returns them to the processing shown in FIG. 18.

If there are registered contents, then it checks if the information indicating the processing status is "in use" (S1703), and if it is, stores the contents in the program areas to the preserving hard disk drive 115 (S1704). On the other hand if it is not, it clears the registered contents concerning the processing in the process control table (S1705). In the same manner, the operation of (S1701)–(S1705) is repeated for all the register contents. In this loop operation, the process control table may be cleared first, and then the program areas registered in the process control table may be stored later.

Next, the contents other than those in the program areas in the memory 107 are stored to the preserving hard disk drive 115 (S1602). The process control table stored at that time is updated as above.

After some more operations including the storing of the other data required to resume the system status to the drive 115, like in Embodiment 1 (S404), the power supply to each unit of the computer system is stopped (S406).

<Embodiment 5>

This embodiment, like Embodiment 4, differs from Embodiment 1 in the functional construction of program routine in which a power-off processing unit 3601 shown in FIG. 20 is provided instead of the power-off processing unit 3501.

In the computer system of this embodiment, the contents of the program areas are not always stored even though the processing status is "in use", so that the capacity of the preserving hard disk drive 115 can be smaller than that in Embodiment 4. This can be done by using a function called on demand loading of the process control unit 301, when the operating system is UNIX. The function enables a program to be loaded automatically if needed, even if it is not held in the memory 107, only if the information is set to the process control table which indicates that it is stored in the hard disk drive 114.

Thus, in the computer system of this embodiment, although the information indicating the stored location is changed, the contents of the program areas are not stored to the drive 115 even though the program is actually held in the memory 107.

However, when the program areas include a work area, or when the program has been changed, the previous status can not be resumed by loading the program from the hard disk drive 114 after the powering back on operation. Therefore, the above procedure is performed only when the contents of the program areas have not been changed after loading.

(Detailed construction of the power-off processing unit 3601)

The power-off processing unit 3601 is provided with a process control table updating unit 3604 in addition to the power-off processing unit 3501 of Embodiment 4. The unit 3604, as shown in FIG. 21(b), changes the storing location registered in the control table shown in FIG. 21 (a) to the "disk" when the contents of the program areas are not modified. The information to indicate whether it is modified or not is controlled by an unillustrated memory control unit.

(The operation performed when the power switch 101 is turned off)

When the power switch 101 is turned off, the power-off processing unit 3601 is started as interrupt processing like in Embodiment 4. The unit 3601 stores the contents of each register of the CPU 106 to the preserving hard disk drive 115 (S401) (S402).

Figure 23:
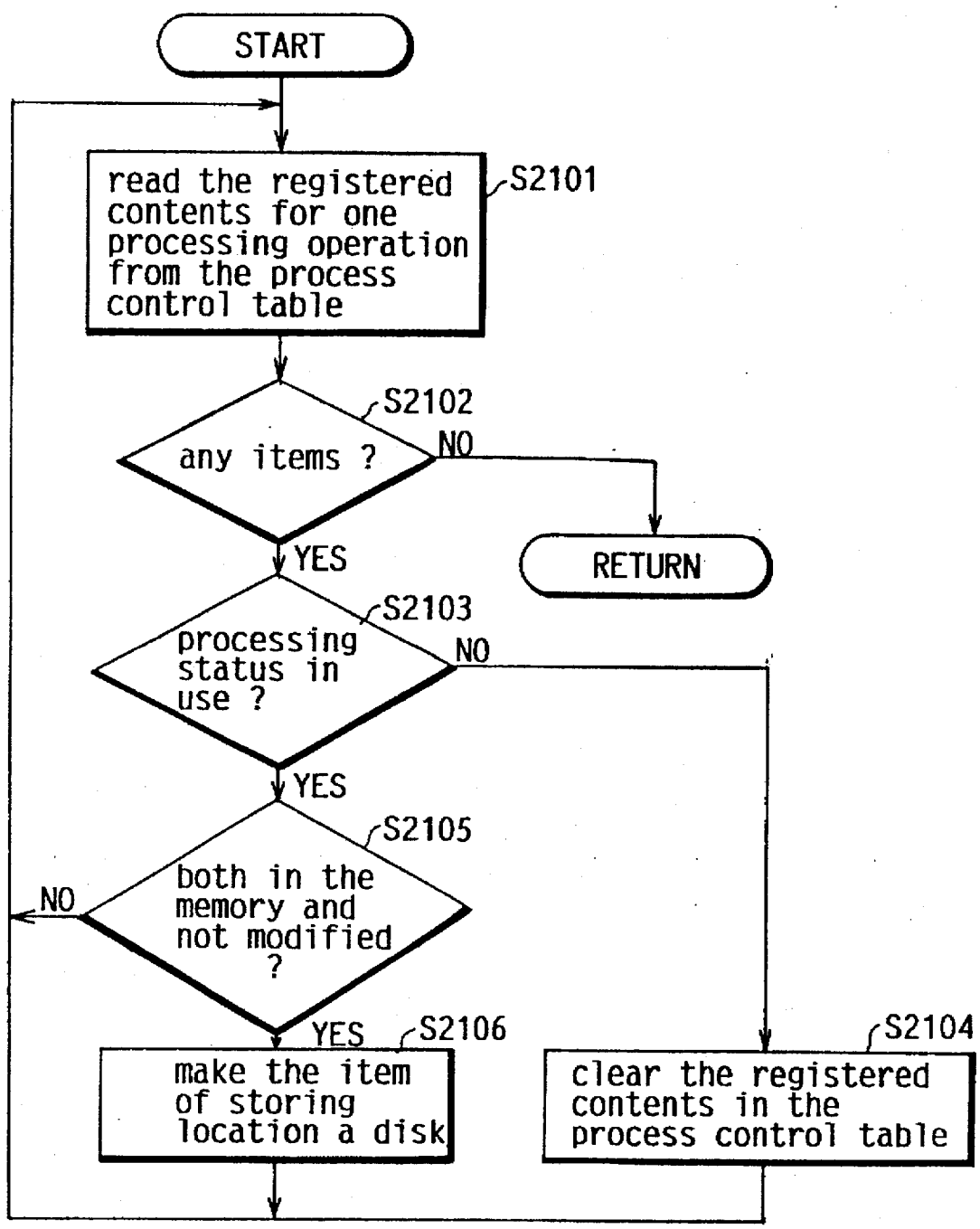
FIG. 23 is a flow chart depicting the detailed operation performed when the process control table of Embodiment 5 is updated.

Next, the unit 3601 updates the process control table (S2001). More specifically, as shown in FIG. 23, the same procedure is performed at (S2101)–(S2104) as the (S1701)

—(S1703) and (S1705) of Embodiment 4, and clears the registered contents in the process control table when the processing status is not "in use". When it is "in use", the unit 3601 judges if both the storing location is in memory and the contents of the program areas is unmodified (S2105), and if both of them are affirmative, it changes the storing location to the "disk" (S2106).

More specifically, since in the example of the process control table of FIG. 21(a), process C is both "in use" and not modified, thus the storing location in the process control table is modified to the "disk" as shown in FIG. 21 (b). Processes D, E, and F are judged not to meet the requirement at (S2105) so that the process control table are not modified at all.

Figure 22:
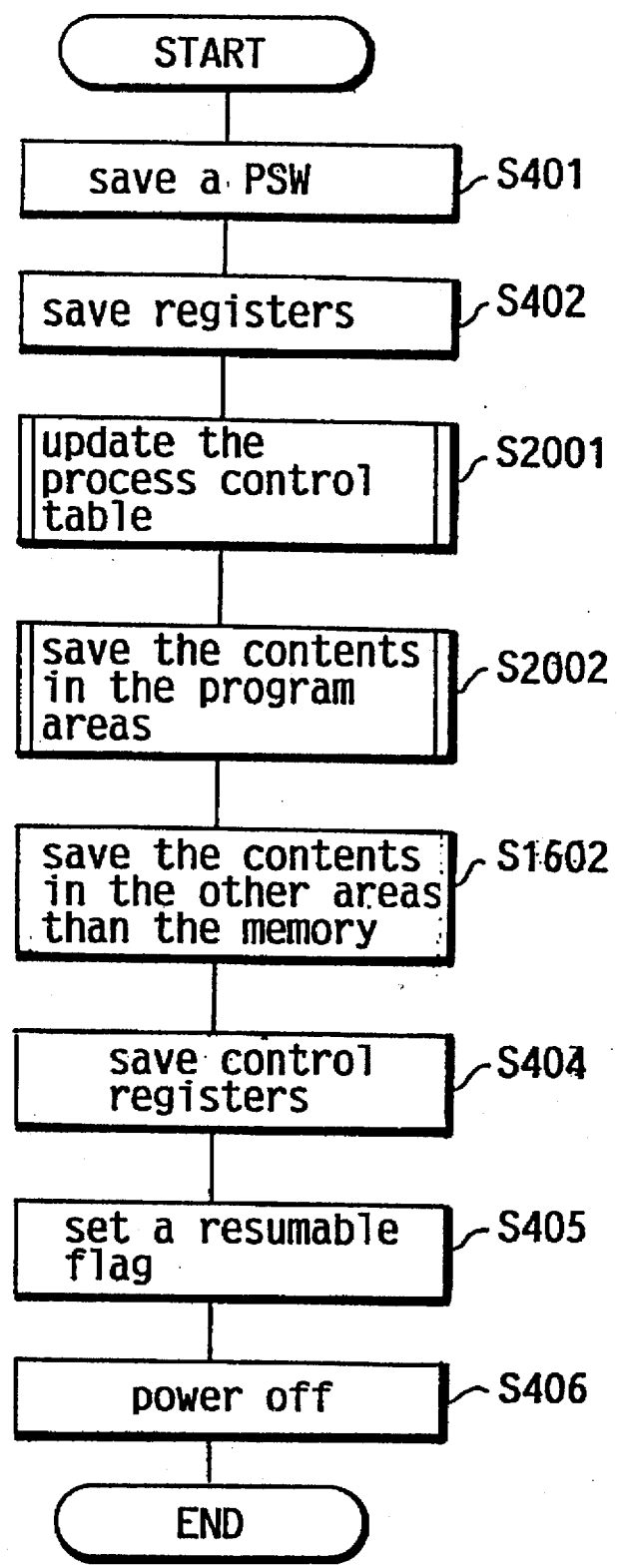
FIG. 22 is a flow chart depicting the operation performed when the power switch of Embodiment 5 has been turned off.

After the procedure of all the registered contents, the operation returns to the processing of FIG. 22.

Figure 24:
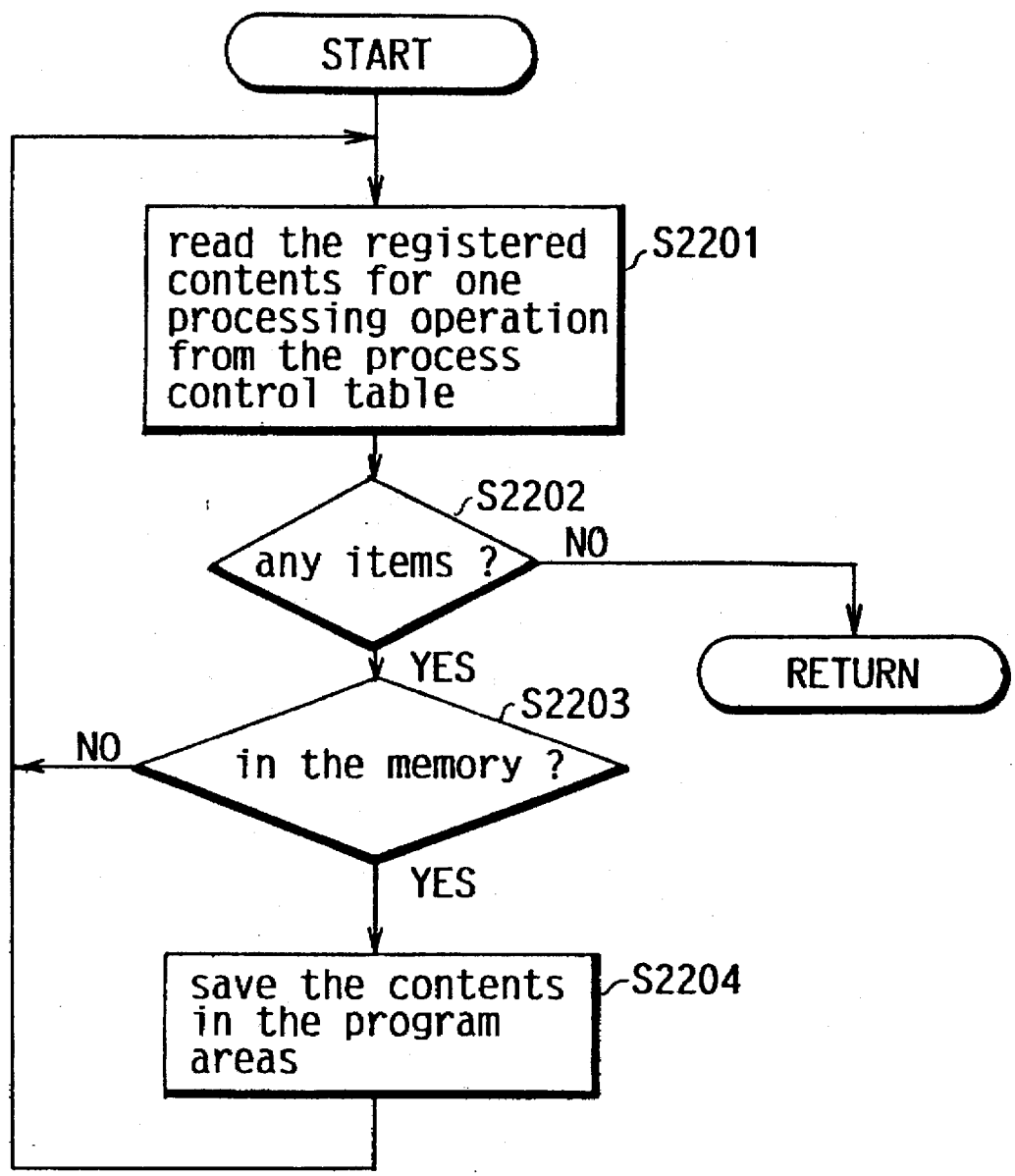
FIG. 24 is a flow chart depicting the detailed operation performed when the contents of the program areas of Embodiment 5 is stored.

Next, the contents of the program areas are stored based on the contents of the updated control table (S2002). More specifically, as shown in FIG. 24, the registered contents are read from the process control table (S2201), if any are present (S2202), and it is determined whether the storing location is in memory. If it is in the memory, the contents of the program areas are stored in the preserving hard disk drive 115 (S2204). If it is not, the operation directly returns to (S2201).

More specifically, in the example of the process control table of FIG. 21(b), only the process D is judged to be in the memory at (S203), and are stored to the disk drive 115 at (S2204). The other processes C, E, and F are judged not in the memory so that they are not stored to the drive 115.

After performing the operations from (S1602) and onward, like in Embodiment 4, the power supply to each unit of the computer system is stopped (S406).

<Embodiment 6>

According to the computer system of this embodiment, the previous status can be resumed even though there is a large amount of data to be stored with the disk drive 115 which does not have a large capacity.

Figure 25:
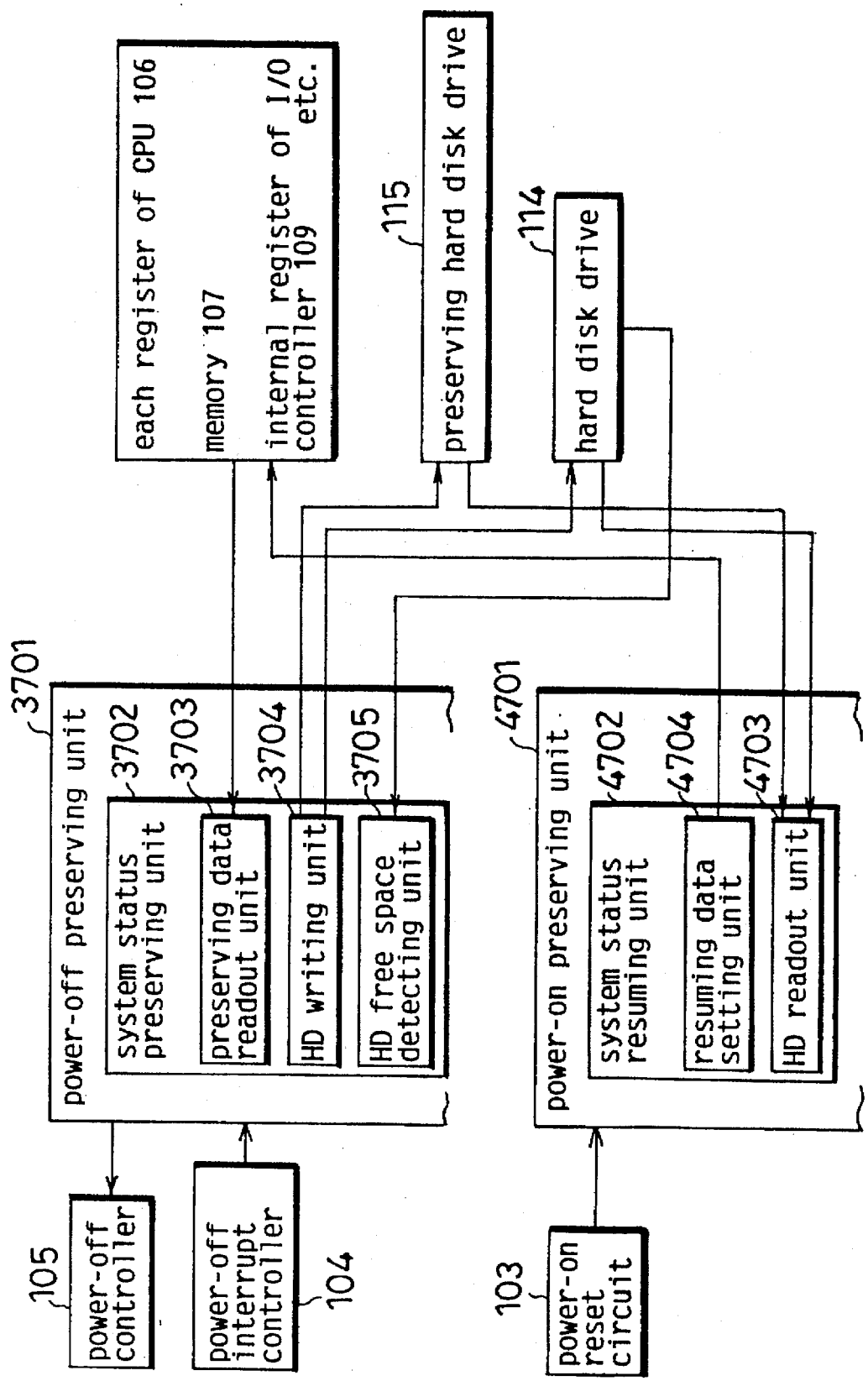
FIG. 25 is a block diagram showing the functional construction of the program routine of Embodiment 6.

This embodiment, like the previous embodiments, differs from Embodiment 1 in the functional construction of program routine in which a power-off processing unit 3701 having the system status preserving unit 3702 therein as shown in FIG. 25 is provided instead of the power-off processing unit 3001. Also, the power-off processing unit 4701 having the system status resuming unit 4702 therein is provided instead of the power-on processing unit 4001.

The system status preserving unit 3702 is provided with a preserving data readout unit 3703, an HD writing unit 3704, and an HD free space detecting unit 3705.

The system status resuming unit 4702 is provided with an HD readout unit 4703 and a resuming data setting unit 4704.

When the system is powered off, the preserving data readout unit 3703 reads out the data required to resume the system status from each register of the CPU 106 and the memory 107.

The HD writing unit 3704 stores the read data to the preserving hard disk drive 115 up to its capacity, and after that, to the hard disk drive 114.

Figure 26:
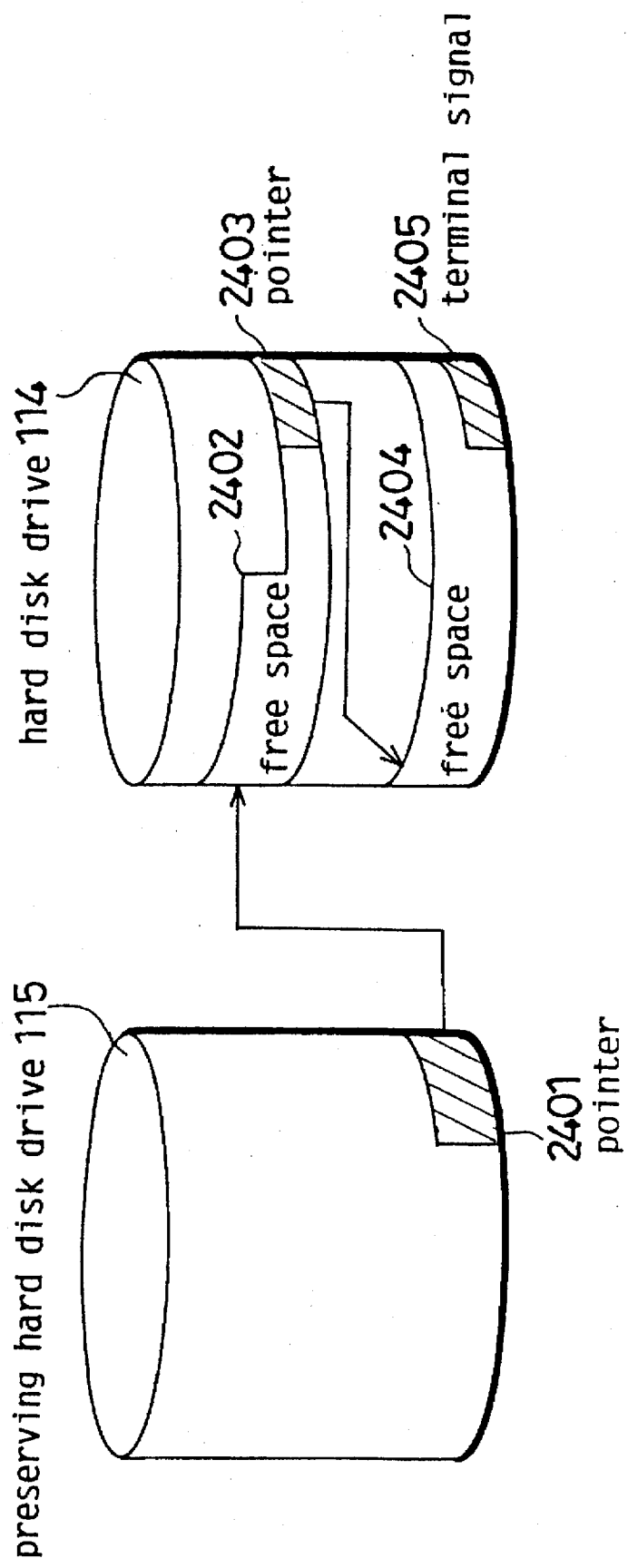
FIG. 26 is an illustration showing the storing construction of the preserving hard disk of Embodiment 6.

Storing to the drive 114 is performed as shown in FIG. 26 based on the control of the HD free space detecting unit 3705.

The unit 3705 detects the free space 2402 of the disk drive 114. The HD writing unit 3704 stores data to the free space 2402, and at the same time writes a pointer 2401 indicating the head position of the free space 2402 to the last area of the disk drive 115.

When there is still extra data to be stored, the HD free space detecting unit 3705 detects the next free space 2404, and the HD writing unit 3704 stores the pointer 2403 indicating the head position of the free space 2404 to the last area of the free space 2402, and stores the remaining data to the free space 2404. After the HD writing unit 3704 stores all the data to be stored, stores a terminal symbol.

The HD writing unit 3704 stores data at high speed by a simple control without the control of the directory or file allocation of the hard disk drive 114. What makes this possible is that the data for the system status resuming is stored sequentially and is done ahead of any access of application program or the like at the powering on operation.

When the system is powered on, the HD readout unit 4703 reads out the data for system status resuming from the preserving hard disk drive 115. If the terminal symbol has not been stored by the last area of the drive 115, the unit 4703 reads out data from the area after the free space 2402 indicated by the pointer 2401 stored in the last area to find the terminal symbol.

The resuming data setting unit 4704 resumes the system status by setting the read out data to each register of the CPU 106 and to the memory 107.

In the above example, the data for system status resuming is stored to the preserving hard disk drive 115. However, it is not limited to the drive 115. Especially, when a non-volatile memory such as an EEPROM or a flash memory is used, it becomes easier to decrease the producing cost by reducing the capacity.

Also, when data is stored to the hard disk drive 114, it has the same advantage of not being restricted by the capacity of the preserving hard disk drive 115 even though the directory or file allocation are controlled like storing normal files.

Although the present invention has been fully described by way of examples with reference to the accompanying drawings, it is noted that various changes and modifications will be apparent to those skilled in the art. Therefore, unless otherwise such changes and modifications depart from the scope of the present invention, they should be construed as being included therein.

What is claimed is:

1. A control unit for a computer system capable of executing a plurality of computer programs at the same time, comprising:

means for providing an on-signal and an off-signal for turning the computer system on and off;

means for applying power to the computer system in response to the on-signal and for removing power from the computer system in response to an overall power-off signal;

a volatile main memory means for holding the plurality of computer programs when the computer system is on;

a process control table for holding data indicating a processing status for each of the plurality of computer programs that are loaded into the volatile main memory means, each processing status being one of "in use" for programs loaded into the volatile main memory means that are currently in execution and "not in use" for programs loaded into the volatile main memory means that are not currently in execution, the volatile main memory means holding both the plurality of computer programs and the process control table when the computer system is on;

a temporary storing means for preserving the in-use computer programs and corresponding in-use execution data indicating an execution status of the in-use computer programs, while the computer system is off; and a power-off processing means for storing, in response to the off-signal, each of the in-use computer programs and the corresponding in-use execution data to the temporary storing means, and for providing the overall power-off signal to remove power from the computer system, the not-in-use computer programs not being stored in the temporary storing means, whereby the temporary storing means may be relatively small.

2. The control unit of claim 1 wherein the temporary storing means is a hard disk drive.

3. The control unit of claim 1 wherein the temporary storing means is an electrical erasable programmable read-only memory (EEPROM).

4. The control unit of claim 1 wherein the temporary storing means is a magneto-optic disk drive.

5. The control unit of claim 1 wherein the temporary storing means is a battery backed-up volatile memory device.

6. The control unit of claim 1 further comprising:
power-on resuming means for returning the programs and the execution data held in the temporary storing means to the memory means in response to the on-signal, the execution data corresponding to the programs.

7. A control unit for a computer system capable of executing a plurality of computer programs at the same time, comprising:
means for providing an on-signal and an off-signal for turning the computer system on and off;
means for applying power to the computer system in response to the on-signal and for removing power from the computer system in response to an overall power-off signal;
a process control table for holding a data set for each of the plurality of computer programs, each data set indicating a processing status, a storage location, and a modification status of a corresponding computer program, the processing status being one of "in use" for programs in the volatile memory that are currently in execution and "not in use" for programs in the volatile memory that are not currently in execution, the storage location being one of "memory" and "disk," and the modification status being one of "modified" and "not modified";
a volatile main memory means for holding the plurality of computer programs and the process control table when the computer system is on;
a temporary storing means for preserving computer programs while the computer system is off; and
a power-off preserving means for storing to the temporary storing means, in response to the off-signal, each of the plurality of computer programs with a data set indicating that the computer program is "in use," "in memory," and "modified," and for providing the overall power-off signal to remove power from the computer system, all other computer programs not being stored in the temporary storing means, whereby the temporary storing means may be relatively small.

8. The control unit of claim 7 wherein the temporary storing means is a hard disk drive.

9. The control unit of claim 7 wherein the temporary storing means is an electrical erasable programmable read-only memory (EEPROM).

10. The control unit of claim 7 wherein the temporary storing means is a magneto-optic disk drive.

11. The control unit of claim 7 wherein the temporary storing means is a battery backed-up volatile memory device.

12. The control unit of claim 7 further comprising:
power-on resuming means for returning the execution data held in the temporary storing means to the memory means in response to the on-signal.

13. A control unit for a computer system capable of executing a computer program by executing data in volatile data locations, comprising:
means for providing an on-signal and an off-signal for turning the computer system on and off;
means for applying power to the computer system in response to the on-signal and for removing power from the computer system in response to an overall power-off signal;
a primary storing means for holding data while the computer system is off;
a temporary storing means for preserving the execution data while the computer system is off, the temporary storing means having a limited storage capacity;
means for storing the execution data in the temporary storing means in response to the off-signal;
first power-off preserving means for storing a first portion of the execution data in the limited storage capacity of the temporary storing means; and
second power-off preserving means for storing any remaining portion of the execution data in the primary storing means, and for providing the overall power-off signal to remove power from the computer system,
whereby storage of the execution data is not limited to the temporary storing means and the storage capacity of the temporary storing means may be relatively small.

14. The control unit of claim 13 wherein the temporary storing means is a hard disk drive.

15. The control unit of claim 13 wherein the temporary storing means is an electrical erasable programmable read-only memory (EEPROM).

16. The control unit of claim 13 wherein the temporary storing means is a magneto-optic disk drive.

17. The control unit of claim 13 wherein the temporary storing means is a battery backed-up volatile memory device.

18. A control method of a computer system capable of simultaneously executing a plurality of computer programs loaded in a volatile memory, comprising the following steps:
holding data indicating a processing status for each of the plurality of computer programs in the volatile memory, each processing status being one of "in use" for programs in the volatile memory that are currently in execution and "not in use" for programs in the volatile memory that are not currently in execution;
storing, when the computer system is being turned off, only the plurality of computer programs that are "in use" to a temporary storing means capable of holding the "in use" plurality of computer programs while the computer system is off, the "not in use" computer programs not being stored in the temporary storing means, whereby the storing may occur relatively fast and the temporary storing means may be relatively small; and
removing power from the computer system.

19. A control method of a computer system capable of simultaneously executing a plurality of computer programs loaded in a volatile memory, comprising the following steps:
holding a data set for each of the plurality of computer programs, each data set indicating a processing status, a storage location, and a modification status of a corresponding computer program, the processing status being one of "in use" for programs in the volatile memory that are currently in execution and "not in use" for programs in the volatile memory that are not currently in execution, the storage location being one of "memory" and "disk," and the modification status being one of "modified" and "not modified"; and storing, when the computer system is being turned off, each of the plurality of computer programs with a data set indicating that the computer program is "in use," "in memory," and "modified" to a temporary storing means capable of holding the plurality of computer programs while the computer system is off, all other computer programs not being stored in the temporary storing means, whereby the storing may be relatively fast and the temporary storing means may be relatively small; and removing power from the computer system.

20. A control method of a computer system capable of executing a computer program by processing execution data in volatile data locations, comprising the following steps:

storing, in response to the computer system being turned off, a first portion of the execution data in a temporary storing means, the temporary storing means being capable of holding the execution data when the computer system is off and having a limited capacity;

storing any remaining portion of the execution data in a primary storing means; and removing power from the computer system, whereby storage of the execution data is not limited to the temporary storing means and the temporary storing means may be relatively small.

* * * * *